(12) United States Patent
Lee et al.

(10) Patent No.: US 11,322,993 B2
(45) Date of Patent: May 3, 2022

(54) DEVICE AND METHOD FOR PROVIDING USER INTERFACE ACCORDING TO WIRELESS POWER-SHARING

(71) Applicant: Samsung Electronics Co., Ltd., Gyeonggi-do (KR)

(72) Inventors: Jungmin Lee, Gyeonggi-do (KR); Sungjoon Cho, Gyeonggi-do (KR); Hansol Choi, Gyeonggi-do (KR); Youngmi Ha, Gyeonggi-do (KR); Kyounghoon Kim, Gyeonggi-do (KR); Byungwook Kim, Gyeonggi-do (KR); Yusu Kim, Gyeonggi-do (KR); Kyungmin Park, Gyeonggi-do (KR); Jaesung Lee, Gyeonggi-do (KR); Juhyang Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 16/749,063

(22) Filed: Jan. 22, 2020

(65) Prior Publication Data
US 2020/0266674 A1    Aug. 20, 2020

(30) Foreign Application Priority Data
Feb. 19, 2019 (KR) .................. 10-2019-0019550

(51) Int. Cl.
*H02J 7/00* (2006.01)
*H02J 50/80* (2016.01)
*H02J 7/02* (2016.01)

(52) U.S. Cl.
CPC ............ *H02J 50/80* (2016.02); *H02J 7/0047* (2013.01); *H02J 7/00304* (2020.01); *H02J 7/02* (2013.01)

(58) Field of Classification Search
CPC .......... H02J 50/10; H02J 50/80; H02J 50/005; H02J 50/402; H02J 7/342; H02J 13/00006;
(Continued)

(56) References Cited

U.S. PATENT DOCUMENTS

| | | | |
|---|---|---|---|
| 9,979,241 B2 | 5/2018 | Park | |
| 2012/0229084 A1 | 9/2012 | Gu | |
| 2014/0184171 A1 | 7/2014 | Lee et al. | |
| 2014/0239893 A1 | 8/2014 | Akiyoshi et al. | |
| 2015/0233990 A1 | 8/2015 | Lee et al. | |

(Continued)

FOREIGN PATENT DOCUMENTS

| | | |
|---|---|---|
| KR | 10-1752250 B1 | 7/2017 |
| KR | 10-2017-0093549 A | 8/2017 |

(Continued)

OTHER PUBLICATIONS

International Search Report dated May 6, 2020.
European Search Report dated Nov. 26, 2021.

*Primary Examiner* — Binh C Tat
(74) *Attorney, Agent, or Firm* — Cha & Reiter, LLC.

(57) ABSTRACT

An electronic device including a battery, a wireless interface operatively or electrically connected with the battery, a display, a memory, and a processor, wherein the processor is configured to: detect an event while the electronic device is in contact with or is connected to another electronic device via the wireless interface and wirelessly charging-shares power of the battery with the another electronic device via the wireless interface; turn off a wireless charging-sharing function when the event corresponds to a predetermined condition; provide a user notification about the turning-off of the wireless charging-sharing function via the display; and turn on the wireless charging-sharing function when a state of the electronic device corresponds to a wireless charging- (Continued)

sharing condition. The various embodiments also a method of operating the electronic device. Various embodiments are also possible.

20 Claims, 30 Drawing Sheets

(58) Field of Classification Search
CPC ............ H02J 13/00017; H02J 13/0017; H02J 7/00034; H02J 7/00304; H02J 7/0047; H02J 7/0068; H02J 7/007194; H02J 7/02; H02J 7/34; H02J 9/02; H04L 9/088; H04L 9/0841; H04L 67/22
USPC .................................................. 320/106–115
See application file for complete search history.

(56) References Cited

U.S. PATENT DOCUMENTS

| | | | |
|---|---|---|---|
| 2015/0234363 A1* | 8/2015 | Yoon | H02J 7/00308 320/137 |
| 2015/0364943 A1 | 12/2015 | Vick et al. | |
| 2016/0126779 A1* | 5/2016 | Park | H02J 50/80 320/108 |
| 2018/0254666 A1 | 9/2018 | Onishi | |
| 2018/0262038 A1 | 9/2018 | Files et al. | |
| 2018/0287396 A1 | 10/2018 | Hanabusa | |
| 2019/0079557 A1* | 3/2019 | Jung | G06F 13/4282 |

FOREIGN PATENT DOCUMENTS

| | | |
|---|---|---|
| KR | 10-2018-0104381 A | 9/2018 |
| WO | 2010/129369 A2 | 11/2010 |

* cited by examiner

DEVICE AND METHOD FOR PROVIDING USER INTERFACE ACCORDING TO WIRELESS POWER-SHARING

CROSS-REFERENCE TO RELATED APPLICATION(S)

This application is based on and claims priority under 35 U.S.C. 119 to Korean Patent Application No. 10-2019-0019550, filed on Feb. 19, 2019, in the Korean Intellectual Property Office, the disclosure of which is herein incorporated by reference in its entirety.

BACKGROUND

1) Field

Certain embodiments disclose a method and a device for providing a user interface according to wireless power-sharing.

2) Description of Related Art

With the development of digital technology, various types of electronic devices, such as a mobile communication terminal, a personal digital assistant (PDA), an electronic organizer, a smart phone, a tablet personal computer (PC), and a wearable device, have been widely used. Such electronic devices are continuously being improved in hardware and/or software portions thereof for supporting and enhancing the functions thereof.

Electronic devices generally use batteries for portability. Batteries of electronic devices require charging, and methods of charging batteries may be classified into wired charging and wireless charging. For example, the wired charging method may be a contact type charging method in which a charging device (e.g., a wired charging device) is connected to an electronic device in a wired manner so as to supply power to the electronic device. The wireless charging method may be a contactless charging method in which a charging device (e.g., a wireless charging device) charges a battery of an electronic device using magnetic coupling without electrical contact with the electronic device.

A wireless charging device may include a wired charger and a wireless charging pad for receiving power from the outside (e.g., an outlet). Since such a wireless charging device provides power supplied from the outside to the electronic device, processing for current consumption may be unnecessary. The wireless charging device may be inconvenient to carry like a wired charging device because the wireless charging pad needs to be connected to the wired charger.

Wireless charging-sharing, which supplies power from one electronic device to another, is to charge the battery of the other electronic device with power stored in the battery of the one electronic device, which may require processing of current consumption of the electronic device that supplies power. In addition, in the wireless charging-sharing, heat may be generated in the electronic device during charging, and the connection between the two electronic devices may be more unstable than charging using a wired/wireless charging device.

The above information is presented as background information only to assist with an understanding of the disclosure. No determination has been made, and no assertion is made, as to whether any of the above might be applicable as prior art with regard to the disclosure.

SUMMARY

Certain embodiments disclose a method and an electronic device for enabling power-sharing with another electronic device without carrying a wired/wireless charging device by controlling the electronic device to use a wireless charging-sharing function in consideration of a user's convenience and safety.

An electronic device according to certain embodiments may include a battery, a communication module including a wireless interface operatively or electrically connected with the battery, a display, a memory, and a processor. The processor may be configured to: detect an event while the electronic device is in contact with or is connected to another electronic device via the wireless interface and wirelessly charging-shares power of the battery with the another electronic device via the wireless interface; turn off a wireless charging-sharing function when the event corresponds to a predetermined condition; provide a user notification about the turning-off of the wireless charging-sharing function via the display; and turn on the wireless charging-sharing function when a state of the electronic device corresponds to a wireless charging-sharing condition.

A method of operating an electronic device according to certain embodiments may include: an operation of detecting an event while the electronic device shares wireless charging-sharing with another electronic device; an operation of turning off a wireless charging-sharing function when the event corresponds to a predetermined condition; an operation of providing a user notification about the turning-off of the wireless charging-sharing; and an operation of turning on the wireless charging-sharing function when a state of the electronic device corresponds to a wireless charging-sharing condition.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
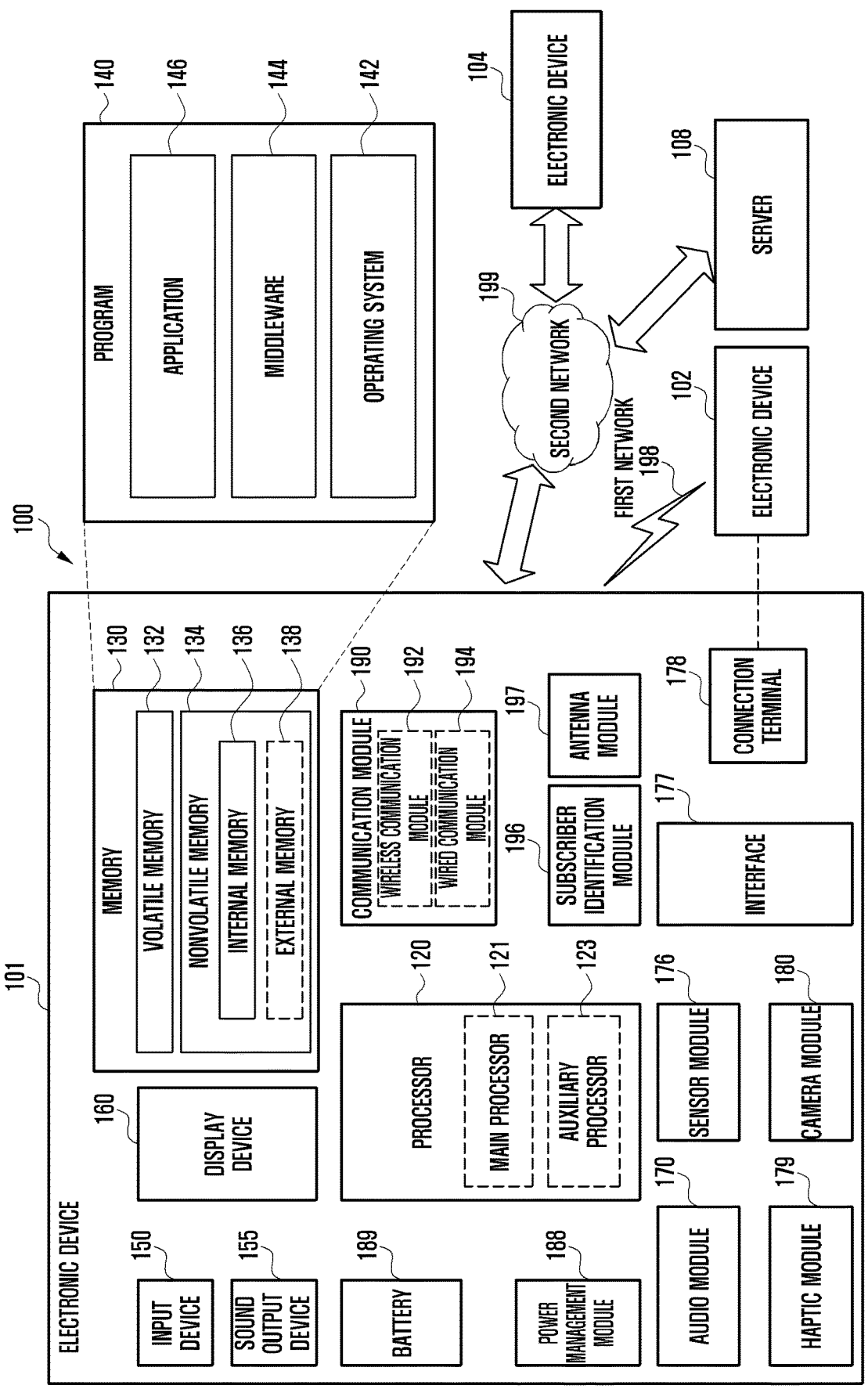
FIG. 1 is a block diagram illustrating an electronic device 101 in a network environment 100 according to certain embodiments.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
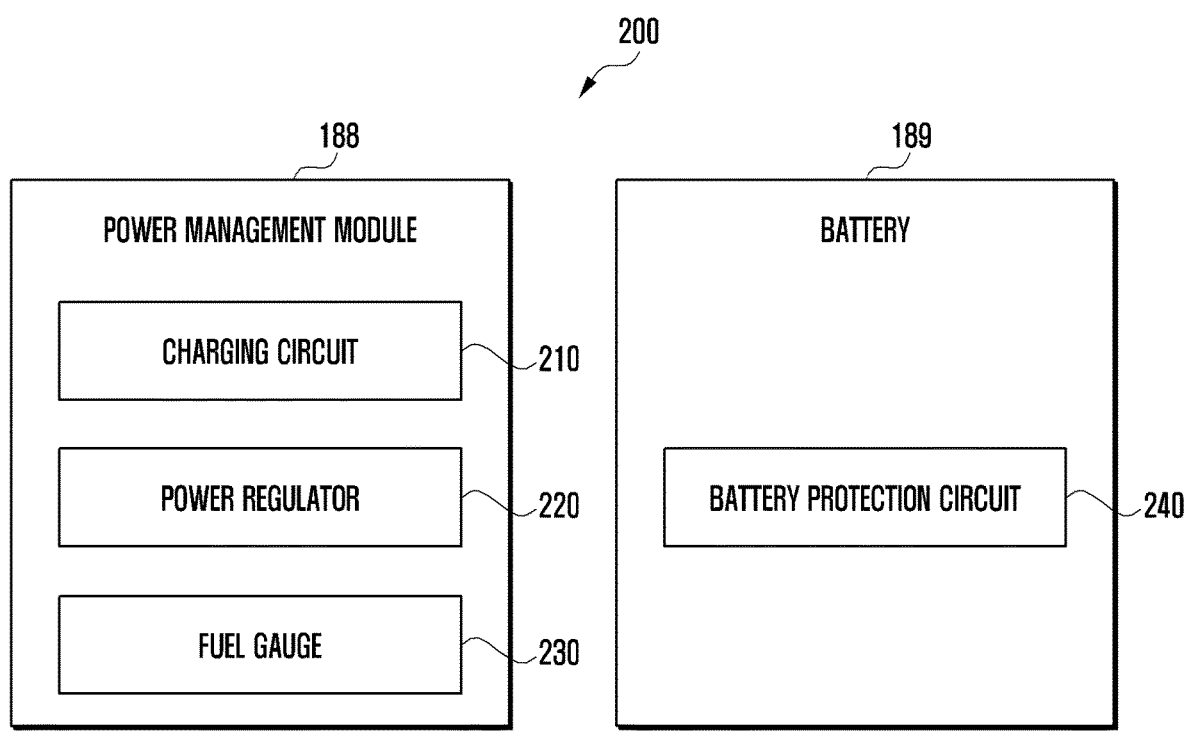
FIG. 2 is a block diagram illustrating a power management module and a battery according to certain embodiments.

FIG. 2 is a block diagram illustrating a power management module and a battery according to certain embodiments.

Referring to FIG. 2, a power management module 188 may include a charging circuit 210, a power regulator 220, or a fuel gauge 230.

The charging circuit 210 may charge a battery 189 using power supplied from an external power source for the electronic device 101. According to an embodiment, the charging circuit 210 may select a charging method (e.g., normal charging or high-speed charging) at least partially based on the type of an external power source (e.g., a power adapter, a USB or wireless charging), the amount of power capable of being supplied from the external power source (e.g., about 20 watts or more), or the attribute of the battery 189, and may charge the battery 189 using the selected charging method. The external power source may be connected, for example, in a wired manner via a connection terminal (e.g., the connection terminal 178) or in a wireless manner via an antenna module (e.g., the antenna module 197).

The power regulator 220 may generate multiple kinds of power having different voltages or different current levels by adjusting the voltage level or the current level of the power supplied from the external power source or the battery 189. The power regulator 220 may adjust the power of the external power source or the battery 189 to a voltage or current level suitable for each component of the components included in an electronic device 101. According to an embodiment, the power regulator 220 may be implemented as a low drop out (LDO) regulator or a switching regulator.

The fuel gauge 230 may measure the use state information of the battery 189 (e.g., the capacity, the charge/discharge frequency, the voltage, or the temperature of the battery).

The power management module 188 may determine charging state information (e.g., life, overvoltage, undervoltage, overcurrent, overcharge, over discharge, overheat, short circuit, or swelling) associated with the charging of the battery 189 at least partially on the basis of the measured usage state information using, for example, the charging circuit 210, the voltage regulator (e.g., power regulator) 220, or the fuel gauge 230. The power management module 188 may determine whether the battery 189 is in an abnormal state or a normal state partially on the basis of the determined charging state information. When it is determined that the battery 189 is in the abnormal state, the power management module 188 may adjust the charging of the battery 189 (e.g., reducing the charging current or voltage, or stopping the charging). According to an embodiment, at least some of the functions of the power management module 188 may be performed by an external control device (e.g., the processor 120).

The battery 189 may include a battery protection circuit module (PCM) 240. The battery protection circuit module 240 may perform various functions (e.g., a pre-blocking function) for preventing performance degradation or burn-out of the battery 189. The battery protection circuit module 240 may be configured in addition or alternative to at least a part of a battery management system (BMS) for performing cell balancing, battery capacity measurement, charge/discharge frequency measurement, temperature measurement, or voltage measurement.

According to an embodiment, at least a part of the state of use information or the state of charge information of the battery 189 may be measured using a corresponding sensor (e.g., a temperature sensor) among the fuel gauge 230, the power management module 188, or the sensor module 276. In this case, according to an embodiment, the corresponding sensor (e.g., a temperature sensor) of the sensor module 176 may be included as a part of the battery protection circuit 240, or may be disposed in the vicinity of the battery 189 as a separate device.

Figure 3:
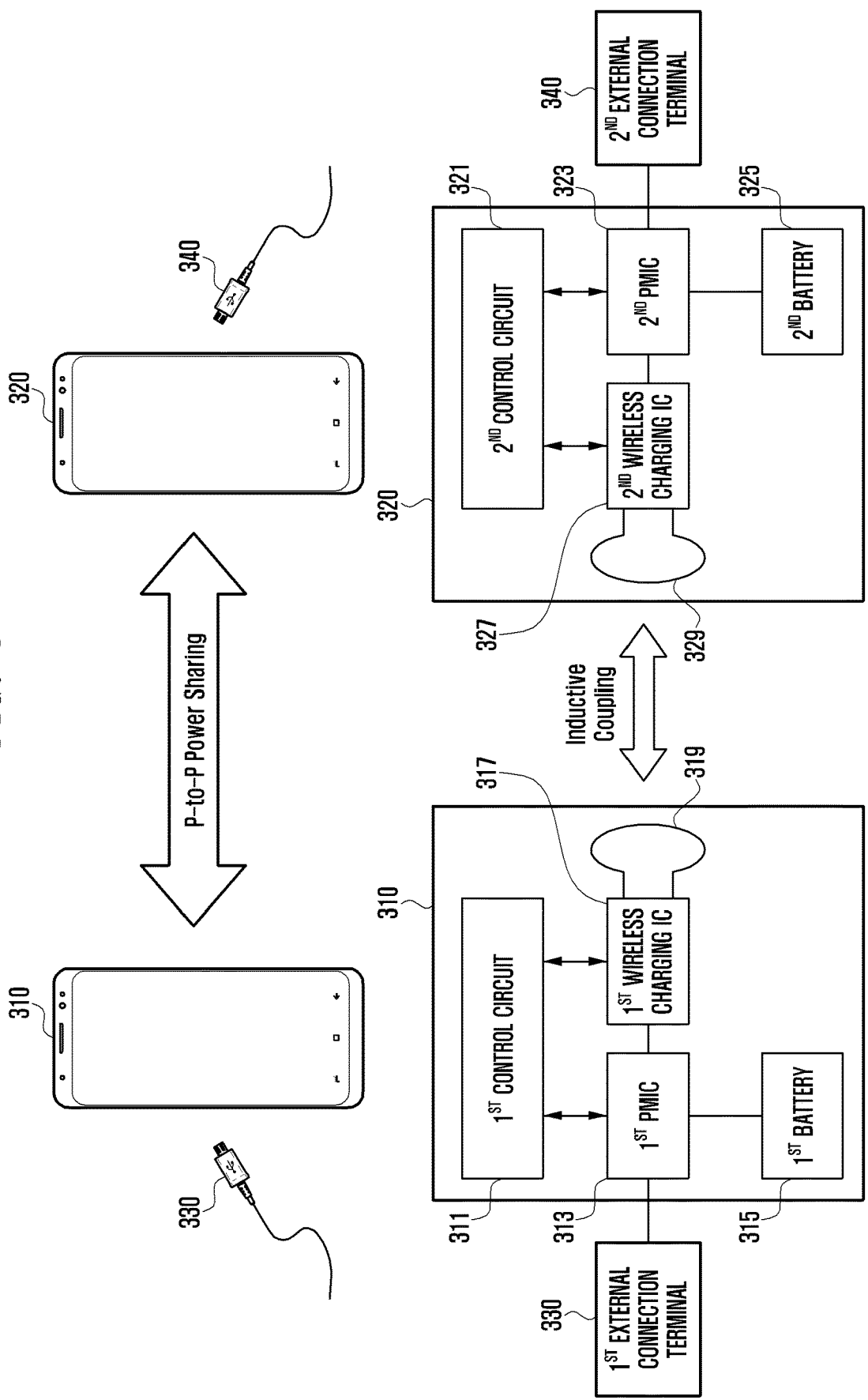
FIG. 3 is a basic conceptual view for explaining a wireless charging-sharing function according to certain embodiments.

FIG. 3 is a basic conceptual view for explaining a wireless charging-sharing function according to certain embodiments.

Referring to FIG. 3, a first electronic device 310 (e.g., the electronic device 101 in FIG. 1) and a second electronic device 320 (e.g., the electronic device 102 in FIG. 1) are both referred to as devices capable of transmitting/receiving wireless power, but one of the electronic devices may be an electronic device capable of receiving wireless power. Herein, a description may be made on the basis of the first electronic device 310, and the second electronic device 320 may be described as an external electronic device. The second electronic device 320 may have the same configuration as the first electronic device 310 or may have a configuration in which a wireless power transmission function is removed.

According to an embodiment, the first electronic device 310 may include a first coil 319, a first wireless charging IC 317, a first PMIC 313 (e.g., the power management module 188 in FIG. 1), a first battery 315 (e.g., the battery 189 in FIG. 1), a first external connection terminal 330 (e.g., a USB) for connection with a first external power supply device (or a wired charging device), and/or a first control circuit 311 (e.g., the processor 120 in FIG. 1). According to an embodiment, the second electronic device 310 may include a second coil 329, a second wireless charging IC 327, a second PMIC 323, a second battery 325, and/or a second control circuit 321. According to an embodiment, the second electronic device 320 may include a second external connection terminal 340 (e.g., a USB) for connection with a second external power supply device (or a wired charging device). According to an embodiment, although a description is made herein on the basis of the first electronic device 310, the components of the first electronic device 310 and the second electronic device 320 may perform the same functions.

According to an embodiment, the first coil 319 may be formed in a spiral shape on an FPCB.

According to an embodiment, the first wireless charging IC 317 may include a full bridge circuit. For example, the first wireless charging IC 317 controls the full bridge circuit to be driven as an inverter (e.g., DC→AC) in a wireless power transmission operation, and to be driven as a rectifier (e.g., AC→DC) in a wireless power reception operation.

According to an embodiment, the first wireless charging IC 317 may exchange information utilized for wireless power transmission with the second electronic device 320 through in-band communication according to the WPC standard. For example, the in-band communication may be a method capable of data exchange performed between the first electronic device 310 and the second electronic device 320 through the frequency or amplitude modulation of a wireless power transmission signal in a wireless power transmission situation between a first coil 319 and a second coil 329. According to certain embodiments, the communication between the first electronic device 310 and the second electronic device 320 may use out-band communication. For example, the out-band communication is different from wireless power signal communication, and may be short-range communication such as NFC, Bluetooth, or Wi-Fi.

According to an embodiment, the first PMIC 313 may include a charger function for charging wired and wireless input power using the first battery 315, a function of communicating with an external power supply device (e.g., a travel adapter) connected to a USB terminal (e.g., a USB battery specification, USB power delivery (PD) communication, AFC communication, and/or quick charging (QC) communication), a function of supplying power to a system and supplying power for the appropriate voltage level for each element, and/or a function of supplying power to the first wireless charging IC 317 in the wireless power transmission mode.

According to an embodiment, the first external connection terminal 330 and the second external connection terminal 340 may be terminals conforming to the USB standard. For example, the first external connection terminal 330 and the second external connection terminal 340 may be interfaces for USB charging and/or on-the-go (OTG) power supply. According to an embodiment, an external power source (e.g., TA or a battery pack) may be connected to the first external connection terminal 330 and the second external connection terminal 340.

According to an embodiment, the first control circuit 311 may integrally control the functions of wired/wireless charging of the first electronic device and USB communication of the first electronic device with the second electronic device 320, and/or communication (e.g., USB PD, BC 1.2, AFC, and/or QC) with the second electronic device 320 according to the situation of the first electronic device 310. For example, BC1.2 or PD may be an interface for communicating with an external power source TA, and the first control circuit 311 may control communication with an external power source. For example, the situation of the first electronic device 310 may include the temperature of the first electronic device 310 and/or the capacity of the first battery 315 of the first electronic device 310.

According to certain embodiments, the first electronic device 310 may operate in a wireless power Tx mode. Alternatively, when the wired power supply device is connected, the first electronic device 310 may preferentially use an external power source in the Tx mode and may charge the remaining power to the first battery 315.

In this document, when the electronic device (e.g., the first electronic device 310 in FIG. 3) operates in the wireless power Tx mode, it may mean that the electronic device is in the state of transmitting wireless power to an external electronic device (e.g., the second electronic device 320 in FIG. 3) using the first coil 319. Alternatively, when the electronic device 310 operates in wireless power Rx mode herein, it may mean that the electronic device 310 is in the state of receiving wireless power from an external electronic device (e.g., the second electronic device 320 in FIG. 3) via the first coil 319 and charging the first battery 315 using the received wireless power.

Figure 4:
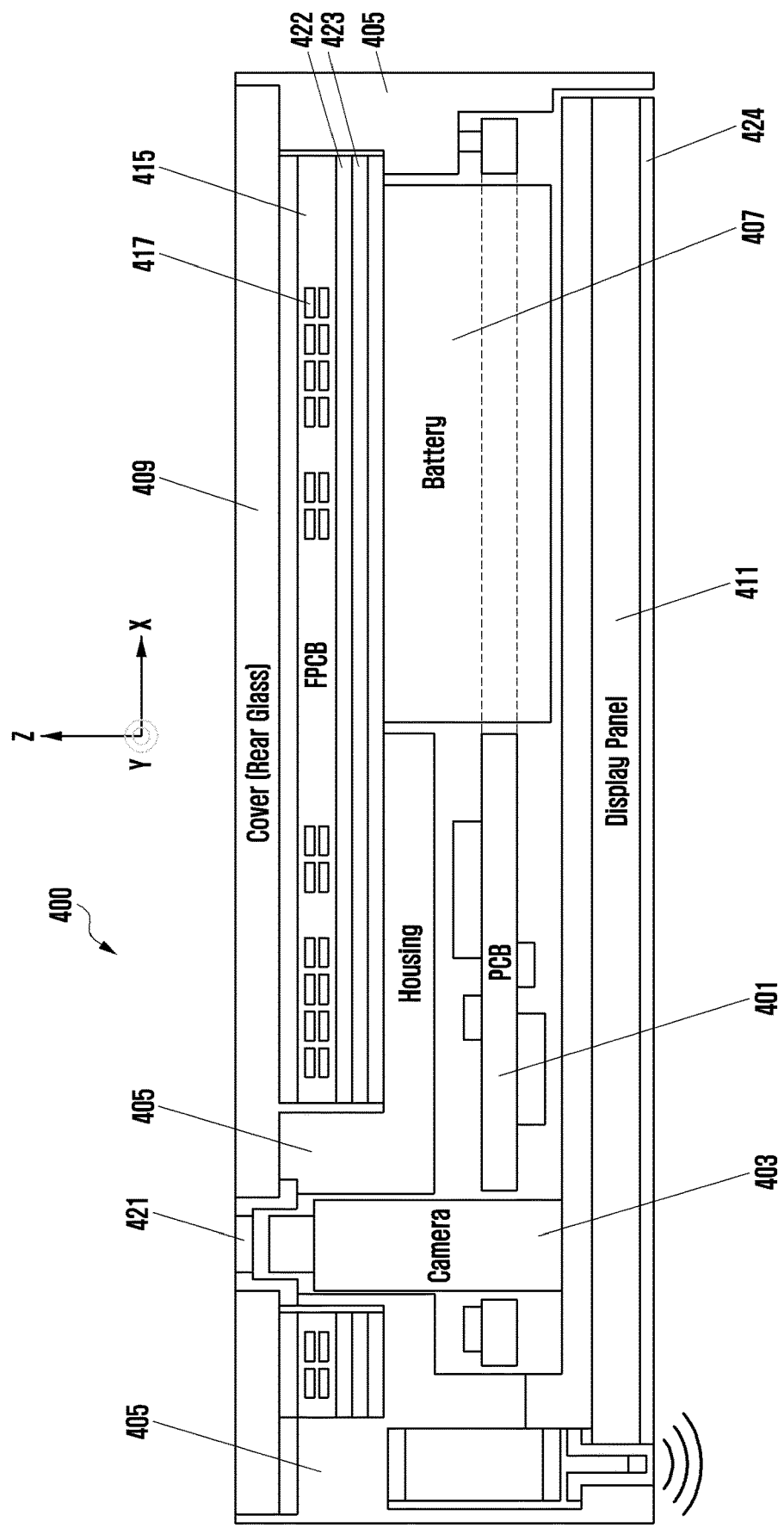
FIG. 4 is a schematic cross-sectional view of an electronic device according to certain embodiments.

FIG. 4 is a schematic cross-sectional view of an electronic device according to certain embodiments.

Referring to FIG. 4, an electronic device 400 (e.g., the electronic device 101 in FIG. 1) may include a housing 405 configured to accommodate one or more components therein, and/or a cover 409 fastened to the housing 405 on the rear side of the electronic device 400. For example, the components may include a display panel 411, a board 401, a battery 407 (e.g., the battery 189 in FIG. 1), a camera 403, and/or an FPCB 415, which are disposed inside the housing 405.

According to an embodiment, the display panel 411 may be disposed on the front face of the electronic device, and glass (a window cover) 424 may be disposed as to cover the top face thereof. According to an embodiment, the display panel 411 may be formed integrally with a touch sensor or a pressure sensor. According to another embodiment, the touch sensor or the pressure sensor may be installed separately from the display panel 411. For example, in certain embodiments, the touch sensor may be disposed between the glass 424 and the display panel 411.

According to an embodiment, the board 401 may have components such as a communication module (e.g., the communication module 190 in FIG. 1) or a processor (e.g., the processor 120 in FIG. 1) mounted thereon. According to an embodiment, the board 401 may be implemented using at least one of a printed circuit board (PCB) and a flexible printed circuit board (FPCB). According to an embodiment, the board 401 may operate as a ground plate capable grounding a loop antenna 417.

According to an embodiment, the cover 409 may be divided into a conductive area made of a conductive material, and a nonconductive area made of a nonconductive material. For example, the cover 409 may be divided into a conductive region and a nonconductive area, located either together at one side, or separately, with each at an opposite side of the conductive area. According to an embodiment, at least one opening 421 may be formed in the cover 409 to expose some components of the electronic device 400 to the outside. For example, the cover 409 may include at least one opening 421 to expose a camera 403, a flash, or a sensor (e.g., a fingerprint sensor).

According to an embodiment, the FPCB 415 may be attached to the bottom face of the cover 409. According to an embodiment, the FPCB 415 may have one or more loop antennas 417 mounted thereon and may be located to be electrically insulated from the conductive area of the cover 409.

According to an embodiment, the one or more loop antennas 417 may be the same type. For example, the one or more loop antennas 417 may be formed of a plane type coil. According to another embodiment, some of the one or more loop antennas 417 may be formed of a plane type coil, and others may be formed of a solenoid type coil.

According to an embodiment, the one or more loop antennas 417 may include a wireless charging coil, and the wireless charging coil may be formed in a spiral pattern.

According to an embodiment, magnetic shielding layers (a shielding sheet 422 and a graphite sheet 423) may be formed on one side of the one or more loop antennas 417. For example, the magnetic field shielding layers 422 and 423 may concentrate the direction of magnetic fields generated from a coil to the rear side of the electronic device 400 (e.g., the Z direction in FIG. 4), and may suppress the formation of magnetic fields inside the electronic device 400 so as to prevent abnormal operation of other electronic components.

Figure 5:
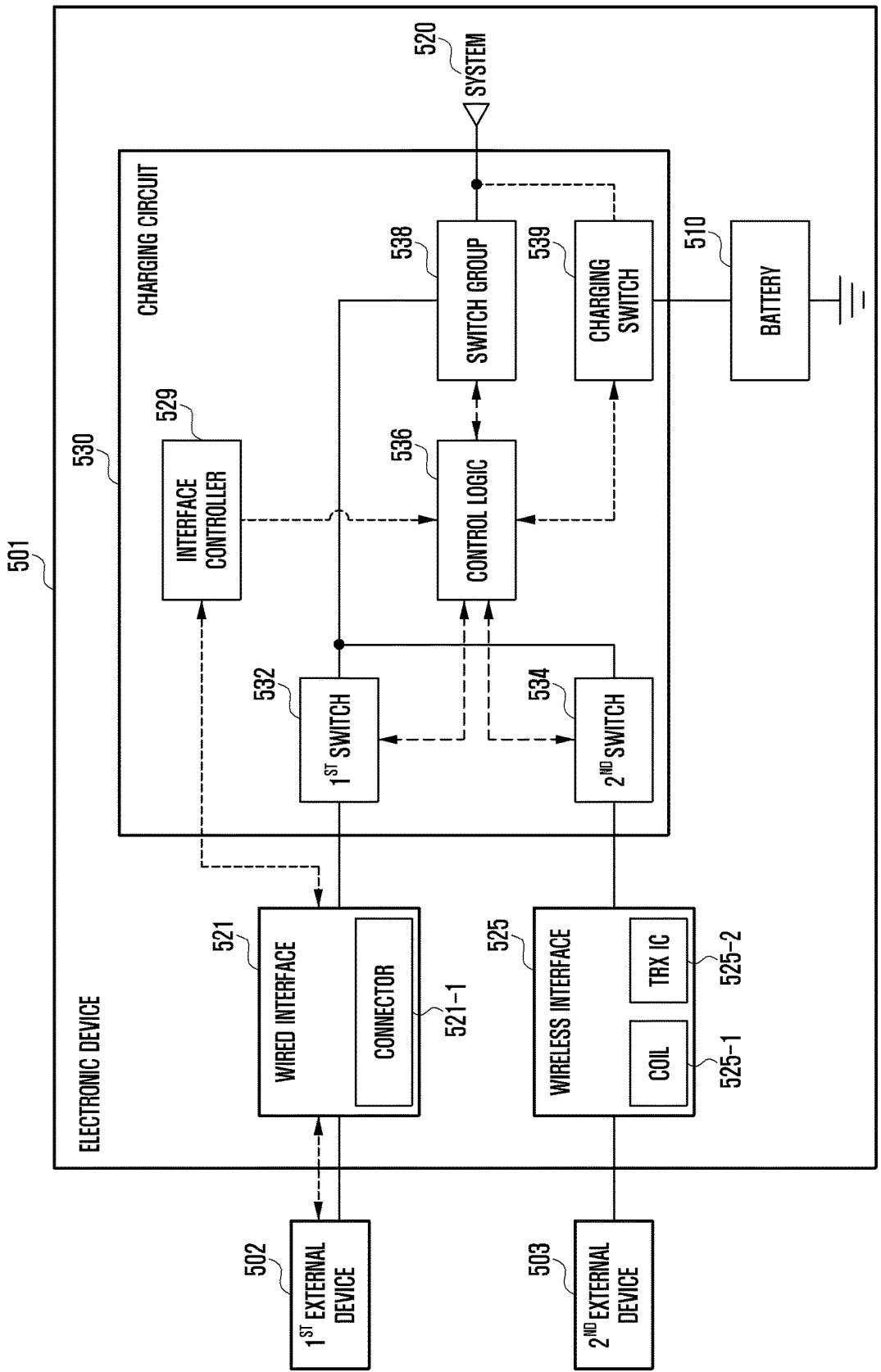
FIG. 5 is a conceptual view for explaining the concept of a charging circuit in an electronic device according to certain embodiments.

FIG. 5 is a conceptual view for explaining the concept of a charging circuit in an electronic device according to certain embodiments.

Referring to FIG. 5, an electronic device 501 (e.g., the electronic device 101 in FIG. 1) according to certain embodiments may include a housing 510, a system 520, a wired interface 521, a wireless interface 525, and/or a charging circuit 530.

According to an embodiment, the battery 510 may be mounted in a housing (e.g., the housing 405 in FIG. 4) of the electronic device 501 and may be chargeable. The battery 510 may include, for example, a lithium-ion battery, rechargeable battery and/or a solar battery. Accordingly, the housing 510 may corresponding in some embodiments to the battery 189 of FIG. 1.

According to an embodiment, the wired interface 521 and the wireless interface 525 may be mounted on a portion of the housing of the electronic device, and each of the wired interface 521 and the wireless interface 525 may be connectable to an external device. The wired interface 521 may include, for example, a universal serial bus (USB) connector 521-1, and may be connectable to the first external device 502 through the connector 521-1 in a wired manner. The wired interface 521 may be an interface for USB charging and/or on-the-go (OTC) power supply or may be connected to an external power source (e.g., a TA or a battery pack). The wireless interface 525 includes a coil 525-1 (also referred to as a "conductive pattern") (e.g., one or more loop antennas 417 in FIG. 4) and a transmission/reception integrated chip (TRX IC) 525-2, and may transmit/receive power to/from the second external device 503 in a wireless manner via the conductive pattern 525-1 and the TRX IC 525-2. Wireless power may be transmitted/received using a magnetic field inductive coupling method, a resonance coupling method, or a hybrid wireless power transmission method thereof. According to an embodiment, the conductive pattern 525-1 may include a first conductive pattern for transmitting wireless power, and a second conductive pattern for receiving wireless power.

According to an embodiment, the first external device 502 may be an external device connectable in a wired manner, and may be a wired power supply device or a wired power receiver. The wired power receiver may be an on-the-go (OTG) device. The OTG device may be a device connected to an electronic device so as to receive power supplied from the electronic device, such as a mouse, a keyboard, a USB memory, or an accessory. In this case, the electronic device may operate in an OTG mode that supplies external power to the USB terminal. The wired power supply device may be a device connected to an electronic device in a wired manner so as to supply power to the electronic device, like a travel adapter (TA). The wired power receiver may be connected to the electronic device to receive power from the electronic device so as to use the power as an internal power source, and may charge another battery provided in the wired power receiver. According to an embodiment, the first external device connected to the electronic device 501 via the wired interface 521 may include a wired high-voltage (HV) device (e.g., a device supporting adaptive fast charging (AFC) or quick charging (QC)). When the wired HV device is connected to the connector, power of a voltage (e.g., 9V) higher than the voltage (e.g., 5V) supplied from the battery 510 may be supplied to or received from the wired HV device.

According to an embodiment, the second external device 503 may include a wireless power supply device or a wireless power receiver. According to certain embodiments of the disclosure, the wireless power supply device may be a device for supplying wireless power to an electronic device using a first conductive pattern, such as a wireless charging pad. The wireless power receiver may receive wireless power supplied from the electronic device using the second conductive pattern, and may charge the received power to another battery included in the wireless power receiver. According to an embodiment, the second external device 503 connected to the electronic device 501 via the wired interface 525 may include a wireless high-voltage (HV) device (e.g., a device supporting adaptive fast charging (AFC) or quick charging (QC).

According to an embodiment, the wireless HV device may include a wireless charging pad that supports high-speed charging. The wireless charging pad may determine whether to perform quick charging by communicating with TRX IC 525-2 via inband communication, or may whether to perform high-speed charging using a separate communication module (e.g., Bluetooth or ZigBee). For example, the electronic device 501 may request the wireless charging pad to charge a high voltage (HV) of, for example, 9V, via the TRX IC 525-2, and the wireless charging pad may determine whether or not high-speed charging is possible through communication with the electronic device in response to the HV charging request from the electronic device 501. When it is confirmed that the high-speed charging is possible, the wireless charging pad may supply power of 9V to the electronic device 501 side.

According to an embodiment, the charging circuit 530 may be electrically connected to the battery 510, and may be connected to electrically connect the wired interface 521 and the wireless interface 525, the battery 510 and the wired interface 521, and the battery 510 and the wireless interface 525. The charging circuit 530 may be configured to: electrically connect the battery 510 and a conductive pattern (e.g., the first conductive pattern) so as to transmit power to the second external device (e.g., a wireless power receiver) in a wireless manner; and transmit power to the first external device (e.g., a wired power receiver) in a wired manner by electrically connecting the battery 510 and a connector simultaneously with transmitting power to the outside.

According to an embodiment, the charging circuit 530 may include an interface controller 529, a first switch 532, a second switch 534, a control logic 536, a switch group 538, and/or a charging switch 539.

According to an embodiment, the interface controller 529 may determine the type of the first external device 502 connected to the wired interface 521, and may determine whether high-speed charging is supported through adaptive fast charge (AFC) communication with the first external device 502. According to an embodiment, the interface controller 529 may include a micro USB interface IC (MUIC) or a high-speed charging interface (e.g., adaptive fast charging (AFC), quick charging (QC) interface). For example, the MUIC may determine whether the first external device 502 connected to the wired interface 521 is a wired power supply device or a wired power receiver. For example, the high-speed charging interface may determine whether to support high-speed charging through communication with the first external device 502. When supporting the high-speed charging, the first external device 502 may increase transmitted/received power. For example, in the case in which the first external device 502 is a wired power supply device that typically transmits 10 W (5V/2A) of power, when the high-speed charging is supported, the first external device 502 is able to transmit 15 W (9V/1.6V) of power.

According to an embodiment, the first switch 532 may include at least one switch, and may control power output to a device (e.g., an OTG device) connected thereto via the wireless interface 521, or power output to a wired power receiver and power input from a power supply device. For example, the first switch 532 may operate in an ON state such that the power to the OTG device or the wired power receiver is output and the power from the wired power supply is input, or may operate in an OFF state such that the power to the OTG device or the wired power receiver is not output and the power from the wired power supply is not input.

According to an embodiment, the second switch 534 may include at least one switch, and may control power input and output from the wireless power supply device and the wireless power receiver via the wireless interface 525 (e.g., the conductive pattern 525-1 and the TRX IC 525-2). For example, the second switch 534 may operate in an ON state such that power input and output from the wireless power supply or the wireless power receiver is possible, or may operate in an OFF state such that power input and output from the wireless power supply device or wireless power receiver is not possible.

According to an embodiment, the control logic 536 may perform control such that power input from at least one of the first switch 532 and the second switch 534 is converted into a charging voltage and a charging current suitable for charging the battery 510, may perform control such that power from the battery is converted into a charging voltage and a charging current suitable for charging another battery of an external device connected to each of the first switch 532 and the second switch 534, and may perform control such that power from the battery 510 is converted into a voltage and a current suitable for use in the external devices.

According to certain embodiments, the control logic 536 may control the charging circuit 530 to selectively transmit power from the battery 510 to the outside in a wireless or wired manner. The control logic 536 may perform control such that power is transmitted to the first external device 502 and/or the second external device 503 via the charging circuit 530 or power is received from the first external device 502 and/or the second external device 503.

According to certain embodiments, when the wired power supply device is connected, the control logic 536 may perform control such that the battery 510 is charged using power received from the wired power supply. In addition, when the OTG device is connected, the control logic 536 may control the OTG device to perform the OTG function. According to certain embodiments, when the wired power supply device is connected, the control logic 536 may perform control such that the battery 510 is charged by receiving power from the wireless power supply device. In addition, when the wireless power receiver is connected, the control logic 536 may perform control such that power is supplied to the wireless power receiver using the power of the battery 510. In addition, when the wired power supply and the wireless power receiver are connected, the control logic 536 may perform control such that the battery 510 is charged by receiving power from the wired power supply device and at the same time, the power is supplied to the wireless power receiver.

According to an embodiment, the switch group 528 may provide a constant current to a system (e.g., the system 520 that supplies power to each module of the electronic device), may boost (↑) or buck (↓) the voltage of the battery 510 in order to provide a constant current to a connected external device, or may boost (↑) or buck (η) the charging voltage provided in order to provide a constant charging current to the battery 510. According to an embodiment, the switch group 528 may include a buck/boost converter.

According to an embodiment, the charging switch 539 may detect a charging current amount, and may stop charging the battery 510 when overcharged or overheated.

According to an embodiment, the electronic device 501 may include a display (e.g., the display 160 in FIG. 1). The display 160 may display a user interface configured to control at least a part of the charging circuit 530. The display 160 may receive a user input that causes the power from the battery 510 to be transmitted to an external device in a wireless or wired manner. The display 160 may display at least one external device connected to the electronic device 501 and may display the remaining battery capacity of the connected external device. Alternatively, the display 160 may display whether power is being supplied to the connected external device or whether power is being received from the connected external device. When a plurality of external devices are connected and power is provided to each of the plurality of external devices, the display 160 may display a screen configured to allow the distribution of power provided to each of the plurality of external devices to be regulated therethrough. In addition, the display 160 may display a screen indicating information on the displays 160 of the connected external devices. At least a part of the content displayed on the display 160 may be changed in response to a signal received from the connected external devices.

Figure 6A:
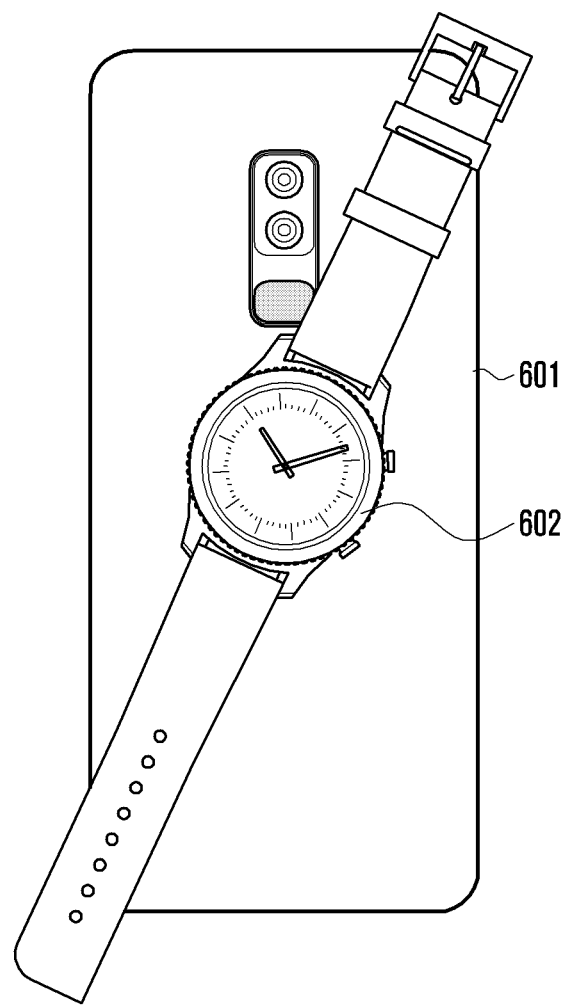
FIG. 6A is a view exemplifying of a user scenario of wireless charging between an electronic device and a wearable device according to certain embodiments.
Figure 6B:
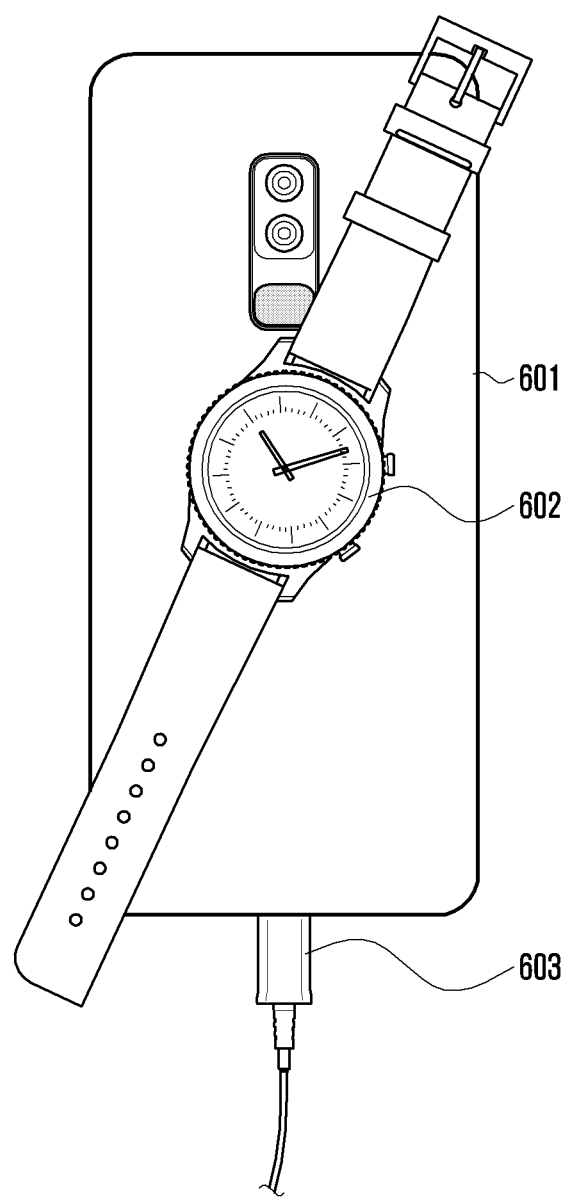
FIG. 6B is a view exemplifying of a user scenario of wireless charging between an electronic device and a wearable device according to certain embodiments.

FIG. 6A exemplifies a user scenario of charging a wearable device 602 in a wireless manner using a wireless charging function of an electronic device, and FIG. 6B exemplifies a user scenario of charging a wearable device 602 in a wireless manner using a wireless charging function of an electronic device.

In the examples illustrated in FIGS. 6A and 6B, the wearable device 602 (e.g., a smart watch, a wireless earphone, or a wireless headset) is illustrated as a wireless power receiver, but the wireless power receiver may be any of various electronic devices capable of receiving relatively low power (e.g., 5V/3.75 W) and capable of being charged in a wireless manner.

Referring to FIG. 6A, an electronic device 601 (e.g., the electronic device 101 in FIG. 1) according to certain embodiments may activate a wireless power Tx mode (or a reception mode), based on a user input. When the power Tx mode is activated, the electronic device 601 may supply power to the wearable device 602 in a wireless manner, using the power of a battery (e.g., the battery 510 in FIG. 5). For example, the user input may include a user's touch input through a display (e.g., the display device 160 in FIG. 1) or manipulation of a physical button formed outside the housing (e.g., the housing 405 in FIG. 4).

Referring to FIG. 6B, when a wired power supply device 603 (e.g., a travel adapter) is connected, the electronic device 601 may receive power from the wired power supply device 603 so as to charge a battery 510 simultaneously with supplying the power to the wearable device 602.

According to certain embodiments, when the wireless power Tx mode is activated, the electronic device 601 may perform in-band communication with the external device 602 according to a specified standard (e.g., the WPC standard), and may exchange information utilized for wireless power transmission with the external device 602. For example, wireless charging according to the WPC standard may include a ping step, an identification and configuration step, or a power transfer step. According to an embodiment, the ping step is a step of determining whether the wireless power receiver (e.g., the wearable device 602 in FIG. 6A) is placed on the wireless charging pad, and may be for example, a step of determining whether the electronic device 601 is close to the device 602 (e.g., the wearable device 602 of FIG. 6A).

According to an embodiment, the identification and configuration step is a step of setting a power transmission amount through communication between the wireless power transmission device (e.g., the electronic device 601 in FIG. 6A) and the wireless power receiver (e.g., the wearable device 602 in FIG. 6A), and may be, for example, a step of determining specified wireless power to be transmitted to the external device 602 by the electronic device 601. According to an embodiment, the power transfer step may be a step of transmitting the specified wireless power, and may be, for example, a step in which the electronic device 601 transmits the specified wireless power to the external device 602. According to an embodiment, when the wireless power Tx mode is activated, the electronic device 601 may perform the three steps to transmit wireless power, and when the wireless power Tx mode is deactivated, the electronic device 601 may not perform the three steps. According to an embodiment, when the Tx mode is deactivated, the electronic device 601 may display a notification indicating that the wireless power Tx mode is deactivated via the display 160.

According to certain embodiments, when the wireless power Tx mode is activated, the electronic device 601 may identify the external device 602 according to a specified standard (e.g., the WPC standard), and may determine specified power corresponding to the identified external device 602. For example, the electronic device 601 may identify that the external device 602 is a wearable device 602 and may determine second specified power (e.g., 5V/3.75 W) corresponding to the wearable device 602. According to an embodiment, the electronic device 601 may transmit wireless power of specified power using an external power source provided from the wired power supply device 603. For example, the electronic device 601 may perform FSK modulation of a transmission device parameter, and may transmit a signal obtained by the FSK modulation of the transmission device parameter to the external device 602 together with a power signal. The electronic device 601 may receive a response to the signal obtained by the FSK modulation of the transmission device parameter from the external device 602, and may determine specified power corresponding to the external device 602, at least partially based on the received response. The electronic device 601 may transmit wireless power to the external device 602 with the specified power.

Figure 7A:
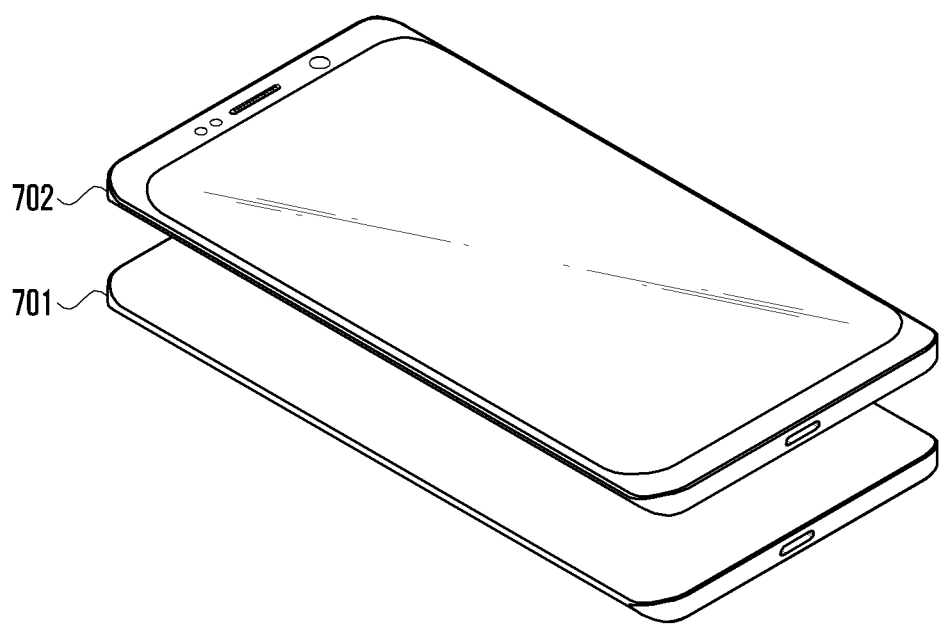
FIG. 7A is a view exemplifying of a user scenario of wireless charging between an electronic device and an external device according to certain embodiments.
Figure 7B:
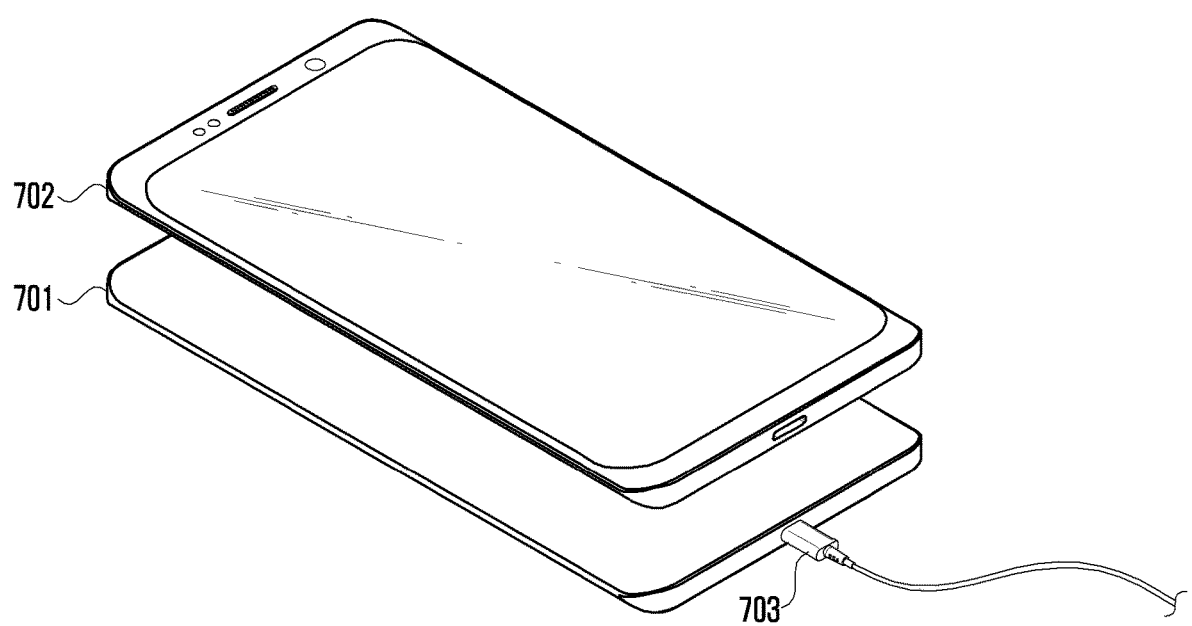
FIG. 7B is a view exemplifying of a user scenario of wireless charging between an electronic device and an external device according to certain embodiments.

FIG. 7A exemplifies a user scenario of charging an external electronic device in a wireless manner using a wireless charging function of an electronic device, and FIG. 7B exemplifies a user scenario of charging an external electronic device in a wireless manner using a wireless charging function of an electronic device.

In the examples illustrated in FIGS. 7A and 7B, another electronic device 702 (e.g., a smart phone) is illustrated as a wireless power receiver, but the wireless power receiver may be any of various electronic devices capable of receiving relatively high power (e.g., 7.5V/7.5 W) and capable of being charged in a wireless manner.

Referring to FIG. 7A, an electronic device 701 (e.g., the electronic device 101 in FIG. 1) according to certain embodiments may activate a wireless power Tx mode, based on a user input. When the power Tx mode is activated, the electronic device 701 may supply power to the external electronic device 702 in a wireless manner using the power of a battery 510 (e.g., the battery 510 in FIG. 5).

Referring to FIG. 7B, when a wired power supply device supporting high-speed charging (e.g., AFC, QC, or PD) (based on 9V/15 W) is connected, the electronic device 701 may receive power from the wired power supply device 703 so as to charge a battery 510 simultaneously with supplying the power to the external electronic device 701. For example, the electronic device 701 may receive power from the wired power supply 703 and supply wireless power to the external electronic device 702 when the wired power supply device 703 supporting high-speed charging is connected.

According to certain embodiments, when the wireless power Tx mode is activated, the electronic device 701 may identify the external device 702 according to a specified standard (e.g., the WPC standard), and may determine specified power corresponding to the identified external device 702. For example, the electronic device 701 may identify that the external device 702 is a smart phone 702 and may determine first specified power (e.g., 7.5V/7.5 W) corresponding to the smart phone 702. According to an embodiment, the electronic device 701 may transmit wireless power of specified power using an external power source provided from the wired power supply device 703. For example, the electronic device 701 may perform FSK modulation of a transmission device parameter, and may transmit a signal obtained by the FSK modulation of the transmission device parameter to the external device 702 together with a power signal. The electronic device 701 may receive a response to the signal obtained by the FSK modulation of the transmission device parameter from the external device 702, and may determine specified power corresponding to the external device 702, at least partially based on the received response. The electronic device 701 may transmit wireless power to the external device 702 with the specified power.

An electronic device (e.g., the electronic device 101 in FIG. 1) according to certain embodiments may include a battery (e.g., the battery 189 in FIG. 1), a wireless interface (e.g., the wireless interface 525 in FIG. 5) operatively or electrically connected to the battery, memory (e.g., the memory 130 in FIG. 1), a display (e.g., the display device 160 in FIG. 1), and a processor (e.g., the processor 120 in FIG. 1). The processor may be configured to: detect an event while the electronic device is in contact with or is connected to another electronic device (e.g., the second electronic device 102 in FIG. 1) via the wireless interface and wirelessly charging-shares power of the battery with the another electronic device via the wireless interface, turn off a wireless charging-sharing function when the event corresponds to a predetermined condition, provide a user notification about the turning-off of the wireless charging-sharing function via the display, and turn on the wireless charging-sharing function when a state of the electronic device corresponds to a wireless charging-sharing condition.

The predetermined condition may be set to include at least one of heat generation, wired charger connection, external device connection, overcurrent detection, or wireless charging error of the electronic device.

The electronic device may further include a sensor module (e.g., the sensor module 176 in FIG. 1), and the processor may be configured to: measure a battery temperature of the electronic device using the sensor module; and turn off the wireless charging-sharing function and provides the user notification when the measured battery temperature is higher than a reference temperature.

The processor may be configured to: turn off the wireless charging-sharing function and provide the user notification when wired charging information is received from the another electronic device.

The processor may be configured to: provide a user notification when a wired charger (e.g., the first external device 502 in FIG. 5) is recognized; and control the wireless charging-sharing function, based on a user input in response to the user notification.

The processor may be configured to maintain the wireless charging-sharing function according to the user input; and perform charging through the wired charger.

The processor may be configured to: turn off the wireless charging-sharing function according to the user input; and perform charging through the wired charger.

The processor may be configured to: provide a user notification when a wired charger is recognized; transmit wired charging information to the another electronic device; and perform charging through the wired charger.

The processor may be configured to: inform the user of detection of an external device (e.g., the first external device 502 in FIG. 5) when the external device is detected; and turn off the wireless charging-sharing function; and output the power of the battery to the external device.

The electronic device may further include a power management module (e.g., the power management module 188 in FIG. 1), and the processor may be configured to: detect use of overcurrent of the electronic device using the power management module; and turn off the wireless charging-sharing function and provides the user notification when the use of the overcurrent is detected.

The processor may be configured to: receive charging status information from the another electronic device; analyze the wireless charging state, based on the charging state information; identify whether the wireless charging-sharing is error, based on a result of the analyzing; count a number of errors when an error of the wireless charging-sharing occurs; determine whether the number of errors exceeds a set number; and control the wireless charging-sharing function, based on whether the number of errors exceeds the set number.

The processor may be configured to: turn off the wireless charging-sharing function when the number of errors does not exceed the set number; and switch the wireless charging-sharing function from OFF to ON so as to perform the wireless charging-sharing function.

The processor may be configured to: turn off the wireless charging-sharing function so as to stop wireless charging-sharing when the number of errors exceeds the set number; and provide a user notification about the stopping of the wireless charging-sharing; and inform the another electronic device of the stopping of wireless charging-sharing.

The processor may be configured to: receive application execution request; identify whether the requested application is an overcurrent-using application; provide a user notification when the requested application is the overcurrent-using application; and control the wireless charging-sharing function, based on a user input in response to the user notification.

The processor may be configured to: cancel execution of the requested application according to the user input; and maintain the wireless charging-sharing function.

The processor may be configured to: turn off the wireless charging-sharing function according to the user input; and execute the requested application.

The processor may be configured to: monitor the state of the electronic device while performing the wireless charging-sharing function; detect abnormality of the electronic device, based on the state of the electronic device; turn off the wireless charging-sharing function so as to stop wireless charging-sharing with the second electronic device when the abnormality of the electronic device is detected; and turn on the wireless charging-sharing function, based on the a wireless charging-sharing request of the user.

The processor may be configured to: determine that there is abnormality in the electronic device when the state of the electronic device corresponds to at least one of states in which the temperature of the electronic device is higher than the reference temperature, in which the overcurrent is used in the electronic device, and in which an error occurs in the wireless charging-sharing.

Figure 8:
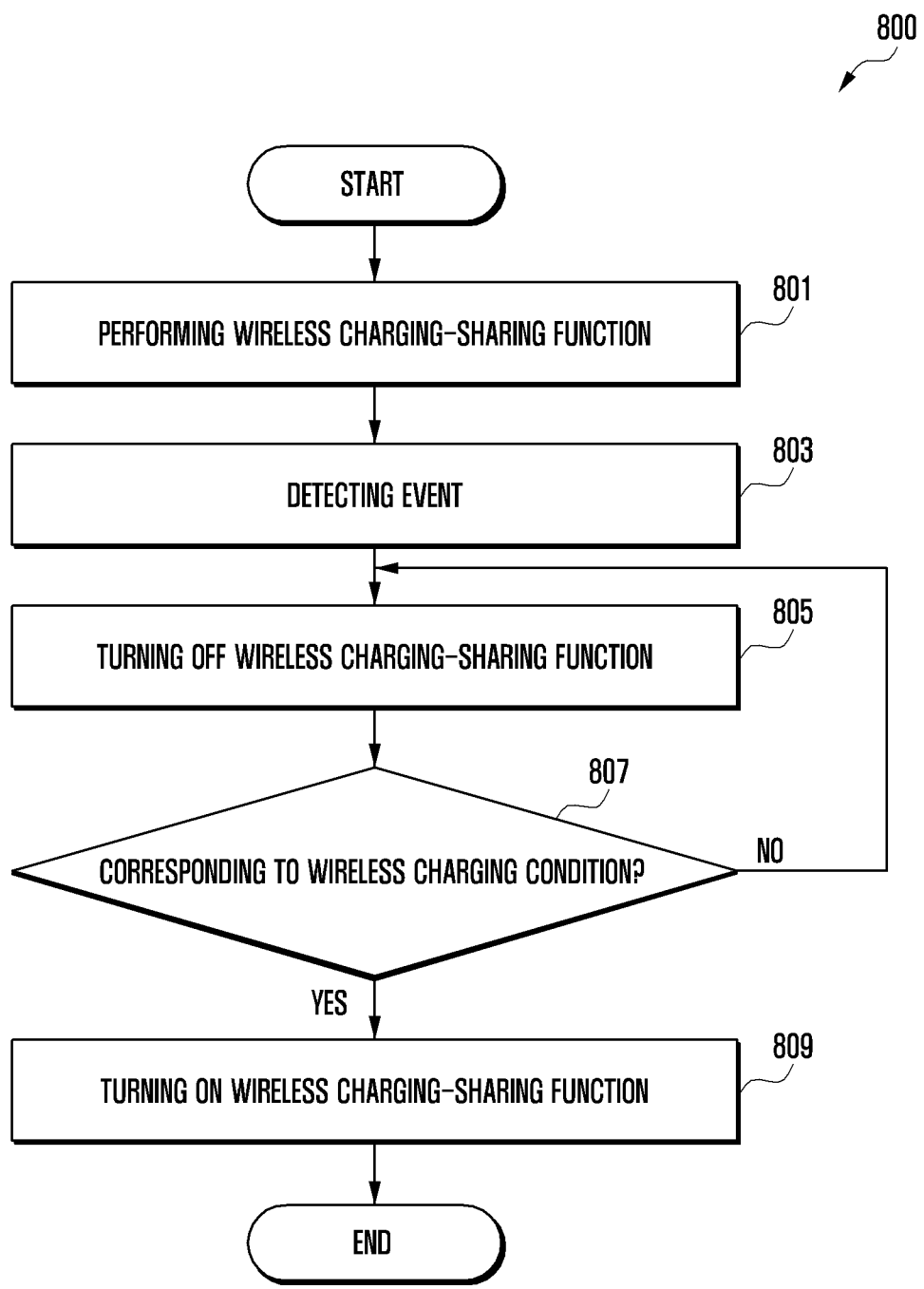
FIG. 8 is a flowchart 800 illustrating a method of operating an electronic device according to certain embodiments.

FIG. 8 is a flowchart 800 illustrating a method of operating an electronic device according to certain embodiments.

Referring to FIG. 8, in operation 801, a processor (e.g., the processor 120 in FIG. 1) of an electronic device (or a first electronic device) (e.g., the electronic device 101 in FIG. 1) according to certain embodiments may perform (or execute) a wireless charging-sharing function (or a wireless power-sharing function). The wireless charging-sharing function may include an operation in which another electronic device (e.g., the electronic device 102 or the electronic device 104 in FIG. 1) is brought into contact with the electronic device 101, or located within a predetermined distance (e.g., generally a short distance) from the electronic device so that the power stored in a battery (e.g., the battery 189 in FIG. 1) of the electronic device 101 may be shared with the another electronic device. For example, the electronic device 101 may transmit power stored in the battery 189 to the second electronic device 102 (e.g., a wireless power Tx mode operation) or may receive power from the second electronic device 102 so as to charge the battery 189 (e.g., a wireless power Rx mode operation). The wireless charging-sharing operation may indicate a state in which power is transmitted to the second electronic device 102 or power is received from the second electronic device 102. During the wireless charging-sharing operation, the processor 120 may display through the user interface that the wireless charging-sharing function is turned on.

For example, when operating in the wireless power Tx mode, the processor 120 may transmit power to the second electronic device 102 using a wireless charging IC (e.g., the first wireless charging IC 317 in FIG. 3). The processor 120 may transmit power stored in the battery 189 through in-band communication via the first coil 319 of the electronic device 101 and the second coil 329 of the second electronic device 102. Or, when operating in the wireless power Tx mode, the processor 120 may receive power from the second electronic device 102 using a wireless charging IC (e.g., the first wireless charging IC 317 in FIG. 3). The processor 120 may receive power stored in the second electronic device 102 through in-band communication via the first coil 319 of the electronic device 101 and the second coil 329 of the second electronic device 102.

According to certain embodiments, the processor 120 may limit the use of some applications when performing the wireless charging-sharing function. For example, the processor 120 may perform control such that a camera application and a calling application cannot be used at the same time. Alternatively, the processor 120 may perform control such that the game application that overloads the electronic device 101 is not executed.

According to certain embodiments, in operation 803, the electronic device 101 may detect an event (e.g., for triggering alteration or termination of the wireless charging-sharing function. The event may include a trigger signal for controlling the wireless charging-sharing function. For example, the event may include at least one of heat generation (e.g., the heat generation of the electronic device 101), wired charger connection, external device (or external electronic device) connection, overcurrent detection, or wireless charging error. The processor 120 may monitor the state of the electronic device 101 while the wireless charging-sharing function is performed. The processor 120 may monitor the state of the electronic device 101 so as to identify whether the current state of the electronic device 101 corresponds to at least one of heat generation, wired charger connection, external device connection, overcurrent detection, or wireless charging error. The processor 120 may monitor the state of the electronic device so as to generate and detect an event.

According to certain embodiments, when the event is detected, the processor 120 may deactivate the wireless charging-sharing function in operation 805. When the wireless charging-sharing function is turned off, the execution of the wireless charging-sharing function may be terminated. When the wireless charging-sharing function is turned off, the processor 120 may display, through the user interface, an indication that the wireless charging-sharing function is turned off. The user of the electronic device 101 may understand, through the indication of the user interface, that the wireless charging-sharing function is turned off. According to an embodiment, when the electronic device 101 operates in the TX mode for transmitting power, the processor 120 may transmit a power transmission stop message to another electronic device (e.g., the second electronic device 102) that supplies power. Or, when the electronic device 101 operates in the RX mode for receiving power, the processor 120 may transmit a power reception stop message to another electronic device (e.g., the second electronic device 102) that receives power. The processor 120 may transmit the power transmission stop message or the power reception stop message through a short-range communication such as NFC, Bluetooth or Wi-Fi via a communication module (e.g., the communication module 190 of FIG. 1), unlike a wireless power signal.

According to certain embodiments, in operation 807, the processor 120 may identify (or determine) whether the state of the electronic device 101 has changed to correspond to a state permitting a wireless charging condition (i.e., or a wireless charging-sharing condition). The wireless charging condition may indicate the state in which the current state of the electronic device 101 does not correspond to the state in which the event was generated. For example, the processor 120 may determine whether the state of the electronic device 101 corresponds to heat generation, wired charger connection, external device connection, overcurrent detection, or wireless charging error. When the state of the electronic device 101 does not correspond to heat generation, wired charger connection, external device connection, overcurrent detection, or wireless charging error, the processor 120 may determine that the state of the electronic device 101 corresponds to the wireless charging condition. When the state of the electronic device 101 corresponds to the wireless charging condition, the processor 120 may perform operation 809, and when the state of the electronic device 101 does not correspond to the wireless charging condition, the processor 120 may return to operation 805. Returning to operation 805 (807—"NO"), the processor 120 may periodically or selectively perform operations 805 and 807.

According to certain embodiments, in the case in which the state of the electronic device 101 corresponds to the wireless charging condition (operation 807—"YES"), in operation 809, the processor 120 may turn on the wireless charging-sharing function. When the wireless charging-sharing function is turned on, wireless charging may be started according to the user's setting or the setting of the electronic device 101. For example, when the wireless charging-sharing function is turned on, the processor 120 may control the electronic device 101 to perform wireless charging. The wireless charging according to an embodiment may be performed in the same manner as operation 801. When the wireless charging-sharing function is turned on, the processor 120 may display, through the user interface, that the wireless charging-sharing function is turned on.

Figure 9:
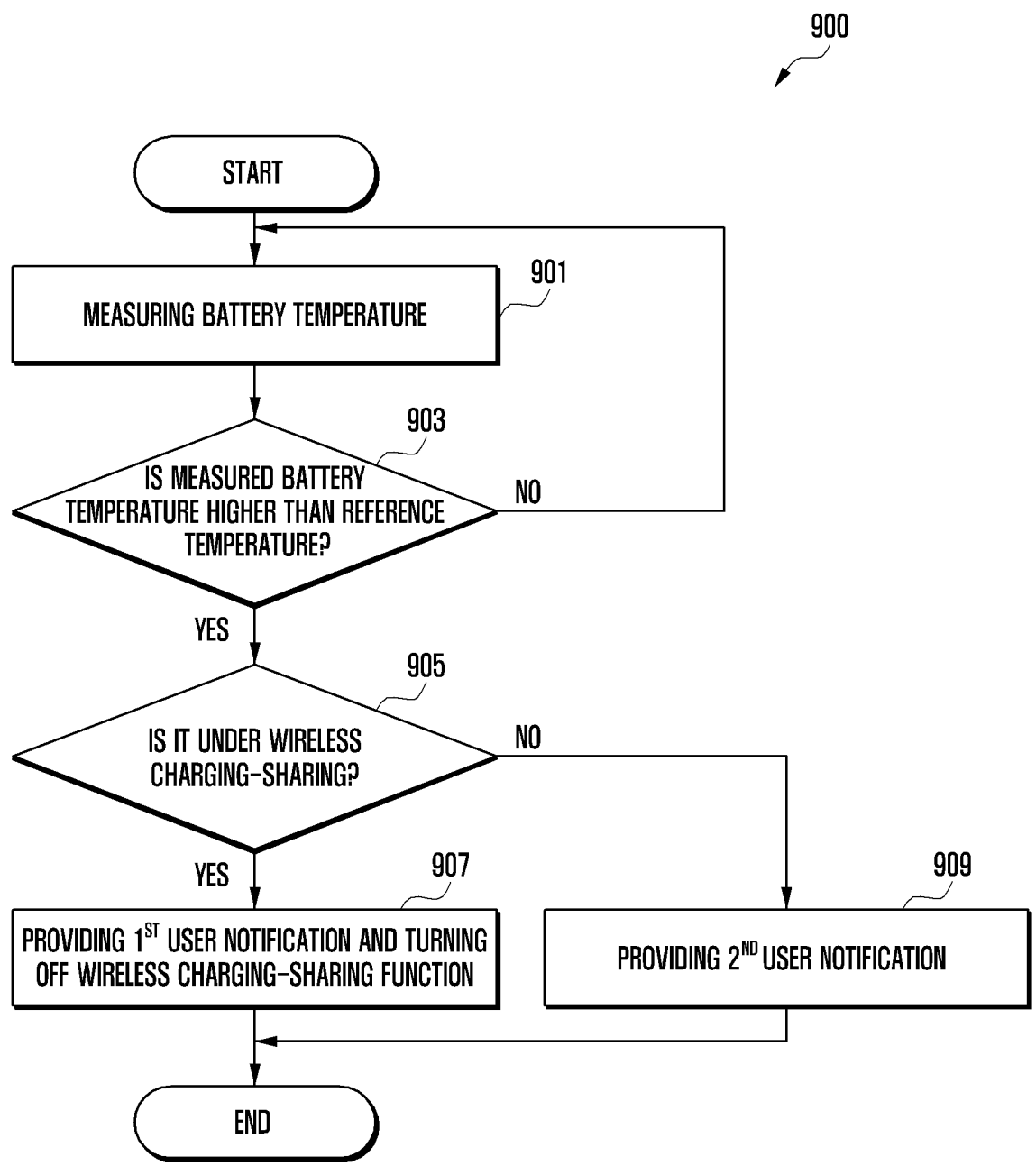
FIG. 9 is a flowchart 900 illustrating a method of controlling a wireless charging-sharing function on the basis of a battery temperature in an electronic device according to certain embodiments.

FIG. 9 is a flowchart 900 illustrating a method of controlling a wireless charging-sharing function on the basis of a battery temperature in an electronic device according to certain embodiments. Operations 901 to 911 of FIG. 9 may be performed regardless whether the electronic device (e.g., the electronic device 101 in FIG. 1) according to certain embodiments operates in the wireless power Tx mode or operates in the wireless power Rx mode.

Referring to FIG. 9, according to certain embodiments, in operation 901, a processor (e.g., the processor 120 in FIG. 1) of the electronic device 101 may measure a battery temperature. For example, the processor 120 may measure the temperature of the electronic device 101 or the battery (e.g., the battery 189 in FIG. 1) of the electronic device 101 using the sensor module 176 of FIG. 1. The processor 120 may periodically or selectively measure the battery temperature or the temperature of the electronic device 101. According to an embodiment, the temperature of the battery 189 may be measured by a temperature sensor (not illustrated) included in the battery 189.

According to certain embodiments, in operation 903, the processor 120 may identify (or determine) whether the measured battery temperature is higher than a reference temperature. The reference temperature may be set by default in the electronic device 101 or may be set by the user. The processor 120 may set the reference temperature, based on the malfunction or the wireless charging-sharing function of the electronic device 101. When the temperature of the electronic device 101 or the battery temperature of the electronic device 101 is higher than the reference temperature, it may cause a failure of the electronic device 101. When the battery temperature is higher than the reference temperature the processor 120 may perform operation 905 for protecting the electronic device 101, and when the battery temperature is equal to or lower than the reference temperature, the processor 120 may return to operation 901. The processor 120 may return to operation 901 and may continuously measure and monitor the battery temperature.

According to certain embodiments, the processor 120 may differently set the reference temperature depending on whether the electronic device 101 is in the state of supplying power of the battery 189 to another second electronic device 102 or in the state of receiving power from the another second electronic device 102. For example, the processor 120 may set the reference temperature in the state of supplying power to be lower than the reference temperature in the state of receiving power. The processor 120 may set the reference temperature in the state of supplying power to 20 degrees C. and may set the reference temperature in the state of receiving power to 25 degrees C. The reference temperature according to the state of the electronic device 101 may be stored in memory (e.g., the memory 130 in FIG. 1) of the electronic device 101. Alternatively, the processor 120 may set one reference temperature regardless of whether the electronic device 101 is in the state of supplying power or in the state of receiving power.

According to certain embodiments, the reference temperature may be variably changed, based on the ambient temperature. The processor 120 may periodically or selectively measure the ambient temperature, and may set the reference temperature, based on the measured ambient temperature. For example, when the ambient temperature is less than 15 degrees C., the processor 120 may set the reference temperature to 20 degrees C., when the ambient temperature is higher than 15 degrees C. and lower than 25 degrees C., the processor 120 may set the reference temperature to 25 degrees C., and when the ambient temperature is higher than 25 degrees C., the processor 120 may set the reference temperature to 30 degrees C. The above description is made for illustrative purposes only, and the setting of the reference temperature depending on the ambient temperature may vary according to actual implementation.

According to certain embodiments, when the battery temperature is higher than the reference temperature (903— "YES"), in operation 905, the processor 120 may identify (or determine) whether or not it is under wireless charging-sharing. The wireless charging-sharing may mean the state in which the electronic device 101 performs a wireless charging-sharing function as in operation 801 in FIG. 8. When the battery temperature is equal to or lower than the reference temperature (903—"NO"), the processor 120 may return to operation 901 and may continuously measure the battery temperature. When it is under the wireless charging-sharing, the processor 120 may perform operation 907, and when it is not under the wireless charging-sharing, the processor 120 may perform operation 911.

According to certain embodiments, when it is under the wireless charging-sharing (operation 905—"YES"), in operation 907, the processor 120 may provide a first user notification and may turn off the wireless charging-sharing function. The first user notification may include a notification indicating that although it has been under wireless charging-sharing, the wireless charging-sharing is stopped due to the heating of the electronic device 101 (or for the protection of the electronic device 101). The first user notification may include at least one of text, an image, or a video. The processor 120 may provide the first user notification through a display (e.g., the display device 160 in FIG. 1) or a speaker (e.g., the sound output device 155 in FIG. 1). In addition, the processor 120 may turn off the wireless charging-sharing function so as to stop the execution of the wireless charging-sharing function.

According to certain embodiments, after turning off the wireless charging-sharing function, the electronic device 101, which operates in the wireless power Tx mode, may transmit a sharing stop massage to the second electronic device (e.g., the second electronic device 102 in FIG. 1), which supplies power. Alternatively, the electronic device 101 may not transmit the sharing stop message. The electronic device 101 may inform the second electronic device of the sharing stop or transmit a sharing stop reason (e.g., heat generation or wired charger connection) to the second electronic device. The electronic device 101 may transmit the sharing stop message through a short-range communication such as NFC, Bluetooth, or Wi-Fi, unlike a wireless power signal. According to certain embodiments, the processor 120 may periodically or selectively measure the temperature or battery temperature of the electronic device 101, and when the temperature or battery temperature of the electronic device is equal to or less than the reference temperature, the processor may turn on the wireless charging-sharing function.

When power is not received from the electronic device 101, the second electronic device supplied with power from the electronic device 101 may determine that wireless charging-sharing is stopped. Alternatively, when the sharing stop message is received, the second electronic device may determine that the wireless charging-sharing is stopped. When power is not received from the second electronic device (e.g., the second electronic device 102 in FIG. 1) from which the electronic device 101 operating in the wireless power Rx mode receives power, the electronic device 101 may turn off the wireless charging-sharing function.

According to certain embodiments, when it is not under the wireless charging-sharing (operation 905—"NO"), in operation 909, the processor 120 may provide a second user notification. The processor 120 may provide the second user notification through the display device 160 or the sound output device 155. The second user notification may be different from the first user notification. The second user notification may include a notification indicating the heat generation of the electronic device 101. Alternatively, the second user notification may inform that some functions of the electronic device 101 may be interrupted due to heat generation of the electronic device 101. The second user notification may include at least one of text, an image, or a video. According to certain embodiments, the second user notification may be the same as the first user notification. When the first user notification and the second user notification are the same, the notifications may inform that some functions of the electronic device 101 (e.g., wireless charging-sharing) or execution of some applications may be interrupted due to the heat generation of the electronic device 101.

According to certain embodiments, the temperature of the electronic device 101 or the battery temperature may be decreased or increased during the operation of the electronic device 101. The processor 120 may control the wireless charging-sharing function depending on whether the temperature of the electronic device 101 or the battery temperature is lower than the second reference temperature as well as the heat generation of the electronic device 101. The reference temperature (e.g., the first reference temperature) may be associated with temperature increasing, and the second reference temperature may be associated with temperature decreasing. Therefore, the processor 120 may control the wireless charging-sharing function for the second reference temperature in a manner, which is the same as or similar to the manner of controlling the wireless charging-sharing function for the first reference temperature. The processor 120 may perform operations 905 to 911, based on whether or not the battery temperature (or the temperature of the electronic device 101) is equal to or lower than the second reference temperature.

Figure 10:
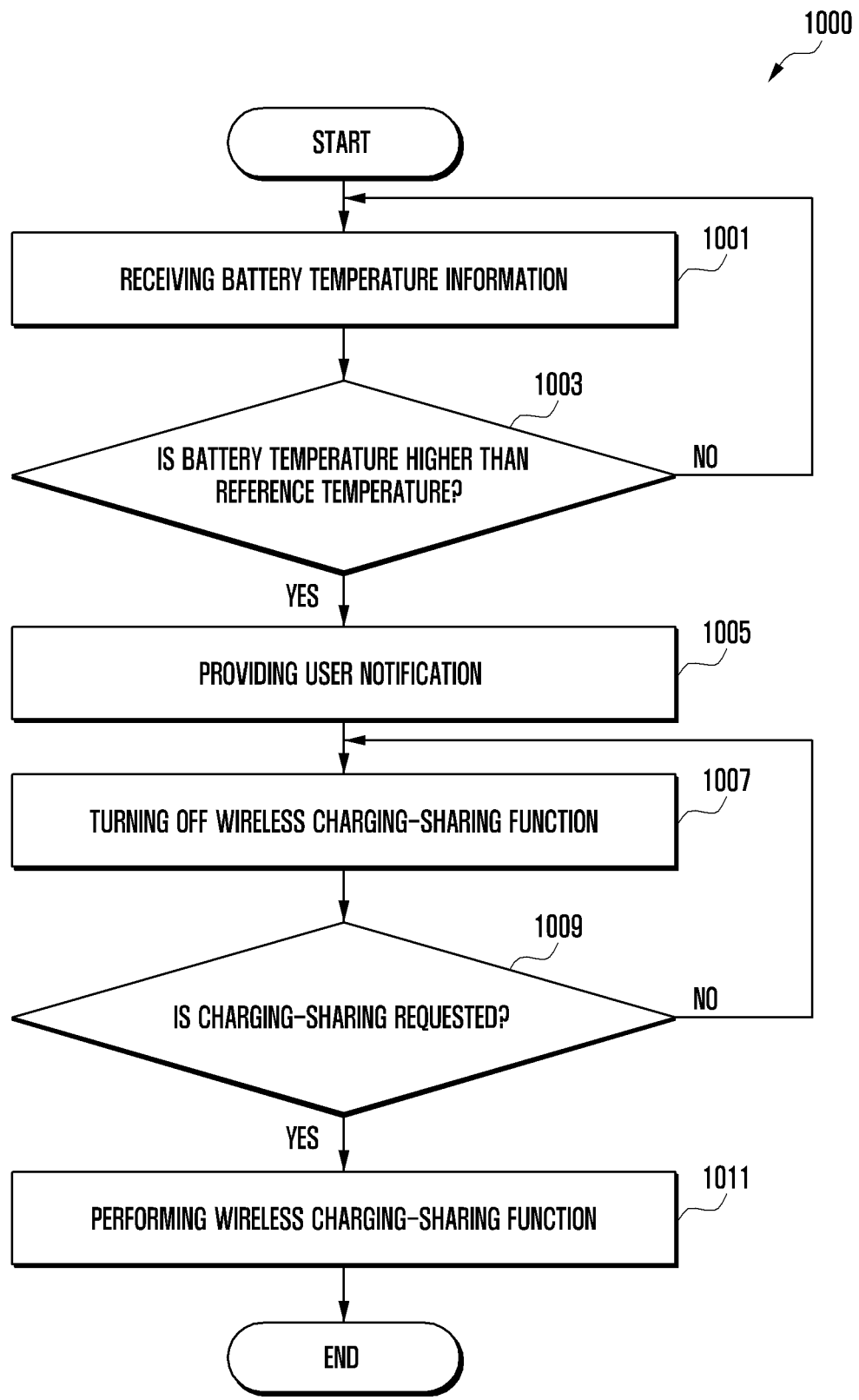
FIG. 10 is a flowchart 1000 illustrating a method of operating an electronic device on the basis of a battery temperature according to certain embodiments.

FIG. 10 is a flowchart 1000 illustrating a method of operating an electronic device, based on a battery temperature according to certain embodiments. The operation of FIG. 10 may an operation that is performed when the electronic device (e.g., the electronic device 101 in FIG. 1) according to certain embodiments operates in the wireless power Tx mode.

Referring to FIG. 10, in operation 1001, a processor (e.g., the processor 120 in FIG. 1) of an electronic device 101 (or the first electronic device) may receive battery temperature information from a second electronic device (e.g., the second device 102 in FIG. 1). At least some terms of the electronic device 102 may be the same as those of the electronic device 101. The battery temperature information may include the temperature of a battery (e.g., the battery 189 in FIG. 1) of the second electronic device 102. The electronic device 101 may be a device that supplies power to the second electronic device 102. When power is supplied to the second electronic device 102, the processor 120 may periodically or selectively receive the battery temperature information from the second electronic device 102. According to certain embodiments, the second electronic device 102 may be an electronic device capable of receiving wireless power. The processor 120 may receive the battery temperature information through short-range communication (e.g., out-band communication).

In operation 1003, the processor 120 may identify (or determine) whether the battery temperature is higher than the reference temperature, based on the battery temperature information. The processor 120 may identify whether the battery temperature of the second electronic device 102 is higher than the reference temperature. The reference temperature may be set by default in the electronic device 101 or may be set by the user. According to certain embodiments, the processor 120 may variably set the reference temperature, based on the ambient temperature. According to certain embodiments, the processor 120 may equally or differently set the reference temperature in the power supply state or the reference temperature in the power reception state. Since the second electronic device 102 is a device that receives power, the processor 120 may identify whether the battery temperature is higher than the reference temperature. When the battery temperature is higher than the reference temperature (operation 1003—"YES"), the processor 120 may perform operation 1005, and when the battery temperature is equal to or lower than the reference temperature (operation 1003—"NO"), the processor 120 may return to operation 1001.

In operation 1005, the processor 120 may provide a user notification. The processor 120 may inform of the heat generation state of the second electronic device through the user notification including at least one of text, an image, or a video. The processor 120 may provide a notification similar to the first user notification of operation 907 of FIG. 9. For example, the processor 120 may provide a notification indicating that although it has been under wireless charging-sharing with the second electronic device 102, the wireless charging-sharing is stopped due to the heat generation of the second electronic device 102. The processor 120 may provide the user notification through a display (e.g., the display device 160 in FIG. 1) or a speaker (e.g., the sound output device 155 in FIG. 1).

In operation 1007, the processor 120 may turn off the wireless charging-sharing function. In addition, the processor 120 may turn off the wireless charging-sharing function so as to stop the execution of the wireless charging-sharing function. When the wireless charging-sharing function is turned off in the electronic device 101, the wireless charging of the second electronic device 102 may be stopped. When the wireless charging-sharing function is turned off in the electronic device 101, since power is not supplied to the second electronic device 102, the second electronic device 102 may determine that the wireless charging is stopped.

In operation 1009, the processor 120 may identify (or determine) whether the wireless charging-sharing is requested. The wireless charging-sharing may be requested by the user of the electronic device 101. For example, when the battery temperature of the second electronic device 102 drops, the processor 120 may inform the user of the fact that the battery temperature of the second electronic device 102 drops through the display device (e.g., the display device 160 in FIG. 1) The user may request the wireless charging-sharing. When the wireless charging-sharing function is switched from "OFF" to "ON" according to the user input, the processor 120 may determine that the wireless charging-sharing is requested. When the wireless charging-sharing is requested (operation 1009—"YES"), the processor 120 may perform operation 1011, and when the wireless charging-sharing is not requested (operation 1009—"NO"), the processor 120 may return to operation 1007. When the wireless charging-sharing is not requested from the user, the processor 120 may return to operation 1007 and may keep the wireless charging-sharing function OFF.

When the wireless charging-sharing is requested, in operation 1011, the processor 120 may perform the wireless charging-sharing function. The processor 120 may transmit power stored in the battery (e.g., the battery 189) of the electronic device 101 to the second electronic device 102.

Figure 11A:
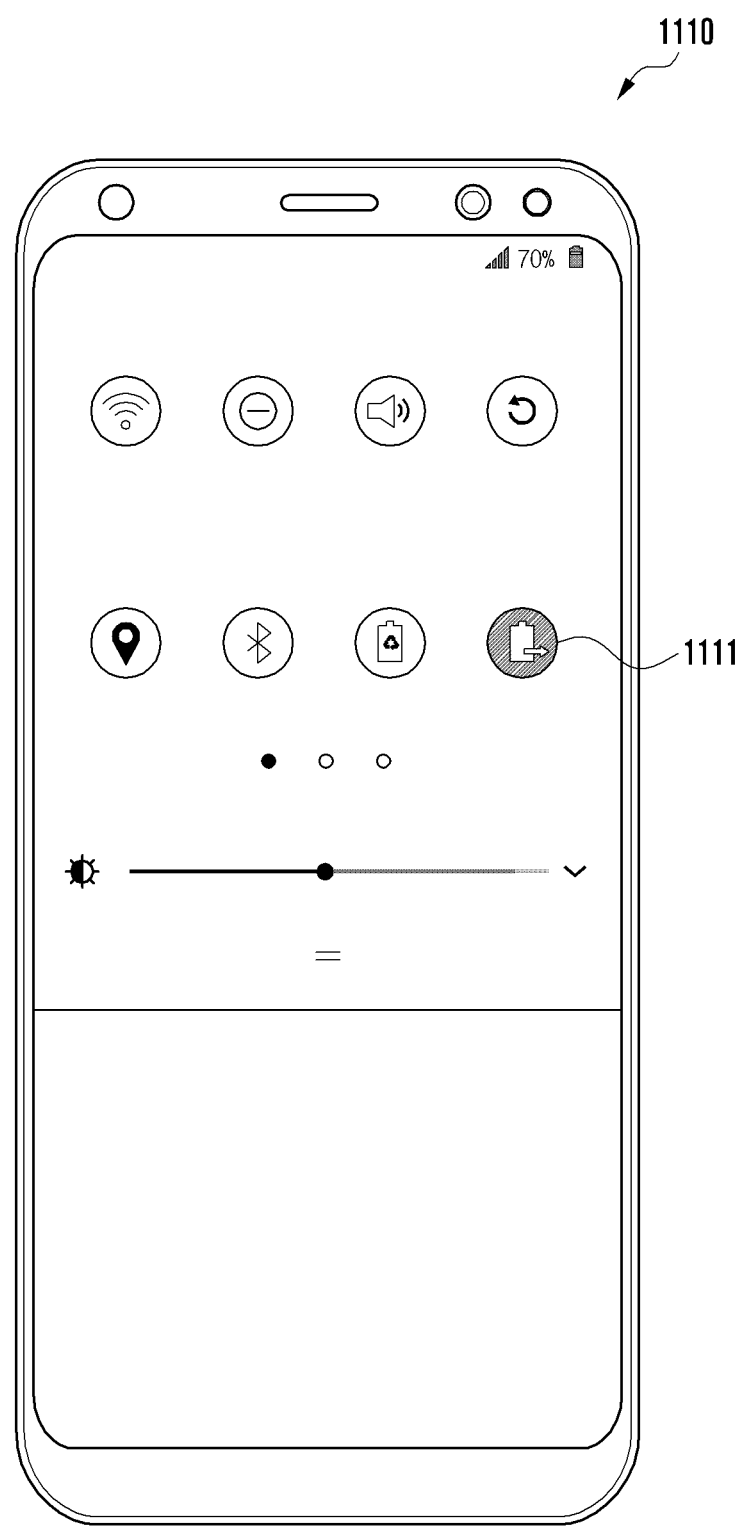
FIG. 11A is a view illustrating an example of a user interface associated with turning-on/off of a wireless charging-sharing function according to certain embodiments.
Figure 11B:
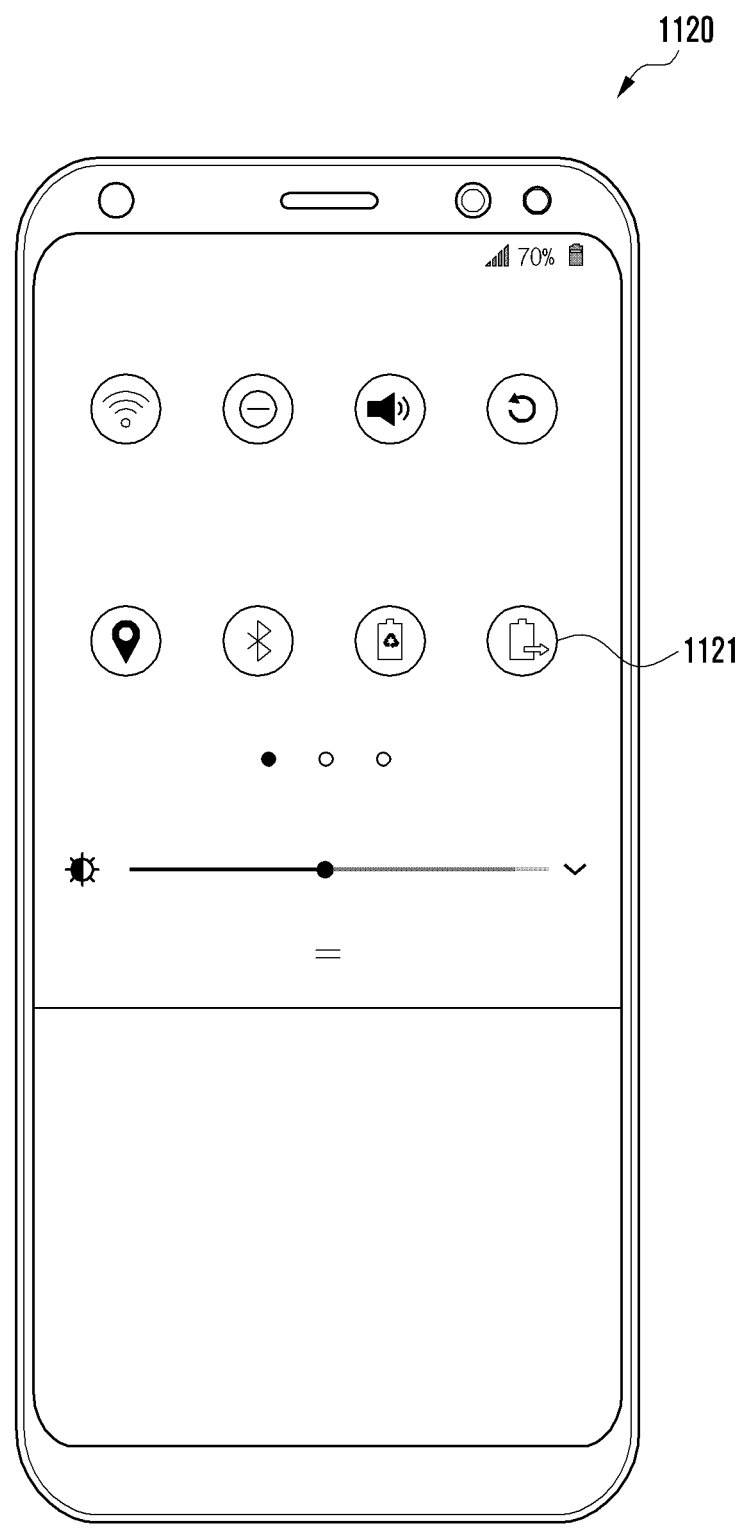
FIG. 11B is a view illustrating an example of a user interface associated with turning-on/off of a wireless charging-sharing function according to certain embodiments.

FIG. 11A is a view illustrating an example of a user interface associated with turning-on/off of a wireless charging-sharing function according to certain embodiments, and FIG. 11B is a view illustrating an example of a user interface associated with turning-on/off of a wireless charging-sharing function according to certain embodiments.

FIG. 11A is a view illustrating an example of the user interface in which the wireless charging-sharing function is turned on, and FIG. 11B is a view illustrating an example of the user interface in which the wireless charging-sharing function is turned off.

Referring to FIGS. 11A and 11B, a processor (e.g., the processor 120 in FIG. 1) of an electronic device (e.g., the electronic device 101 of FIG. 1) according to certain embodiments may provide a first user interface 1110 or a second user interface 1120 through a display (e.g., the display device 160 in FIG. 1) in connection with the wireless charging-sharing function. The first user interface 1110 may include state control information (e.g., an indicative icon) in which the wireless charging-sharing function 1111 is turned on. The second user interface 1120 may include state control information (e.g., an indicative icon or a change in the same) in which the wireless charging-sharing function 1121 is turned off.

According to certain embodiments, the processor 120 may provide the state control information when a touch gesture moving from the upper bezel portion of the electronic device 101 to the display device 160 is detected. For example, the state control information may include at least one of Wi-Fi control (e.g., ON/OFF), ring tone control (e.g., sound/vibration/silence), Bluetooth control (e.g., ON/OFF), screen switching (e.g., automatic length/width switching), and wireless charging-sharing control (e.g., ON/OFF). The processor 120 may provide the first user interface 1110 (e.g., the wireless charging-sharing function being turned on) when the wireless charging-sharing 1121 is selected in the state in which the wireless charging-sharing 1121 is turned off. The processor 120 may provide the second user interface 1120 (e.g., the wireless charging-sharing function being turned off) when the wireless charging-sharing 1111 is selected in the state in which the wireless charging-sharing 1111 is turned on.

Figure 11C:
FIG. 11C is a view illustrating an example of a user interface associated with a battery temperature according to certain embodiments.

FIG. 11C is a view illustrating an example of a user interface associated with a battery temperature according to certain embodiments.

Referring to FIG. 11C, the processor (e.g., the processor 120 in FIG. 1) of the electronic device (e.g., the electronic device 101 in FIG. 1) according to certain embodiments may provide a third interface 1130 through the display (e.g., the display device 160 in FIG. 1), based on the temperature of the battery (e.g., the battery 189 in FIG. 1) of the battery 189 (or the temperature of the electronic device 101). For example, when the battery temperature (or the temperature of the electronic device 101) is higher than the first reference temperature, or when the battery temperature (or the temperature of the electronic device 101) is equal to or lower than the second reference temperature, the processor 120 may provide the third user interface 1130 including a third notification 1131. The user notification 1131 may be provided in the form of a pop-up window and may include at least one of text, an image, or a video. The user notification 1131 may correspond to a notification indicating that the wireless charging-sharing is stopped due to temperature increasing or temperature decreasing of the electronic device 101. The processor 120 may provide a voice guidance corresponding to the user notification 1131 through a speaker (e.g., the sound output device 155 in FIG. 1).

Figure 12:
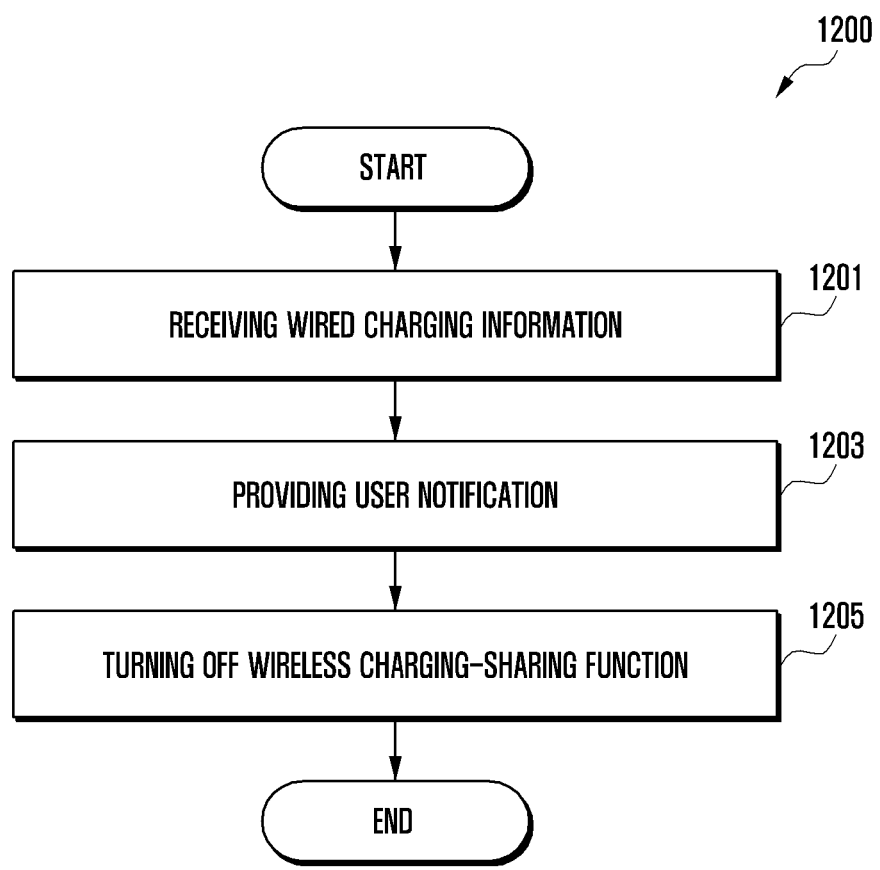
FIG. 12 is a flowchart 1200 illustrating a method of controlling a wireless charging-sharing function on the basis of connection of a wired charger in an electronic device according to certain embodiments.

FIG. 12 is a flowchart 1200 illustrating a method of controlling a wireless charging-sharing function on the basis of connection of a wired charger in an electronic device according to certain embodiments. The operation of FIG. 12 may an operation that is performed when the electronic device (e.g., the electronic device 101 in FIG. 1) according to certain embodiments operates in the wireless power Tx mode.

Referring to FIG. 12, in operation 1201, a processor (e.g., the processor 120 in FIG. 1) of an electronic device 101 (or the first electronic device) may receive wired charging information. The wired charging information may be received from a second electronic device (e.g., the second electronic device 102 in FIG. 1) that receives power from the electronic device 101. At least some terms of the electronic device 102 may be the same as those of the electronic device 101. The wired charging information may be information indicating that a wired charger (e.g., the first external device 502 in FIG. 5) is connected to the second electronic device 102. The processor 120 may receive the wired charging information from the second server 102 via a communication module (e.g., the communication module 190 in FIG. 1).

In operation 1203, the processor 120 may generate and provide a user notification. The user notification may inform the user that the wired charger is connected to the second electronic device 102. The processor 120 may provide the user notification through a display (e.g., the display device 160 in FIG. 1) or a speaker (e.g., the sound output device 155 in FIG. 1).

In operation 1205, the processor 120 may turn off the wireless charging-sharing function. Since the electronic device 102 is connected to the wired charger, power supply to the second electronic device 102 may be discontinued. The processor 120 may turn off the wireless charging-sharing function so as to stop power supply to the electronic device 102. Although the drawing illustrates that operation 1205 is performed after operation 1203, operation 1205 may be performed first and then operation 1203 may be performed, or operation 1203 and operation 1205 may be performed concurrently. The processor 120 may transmit a sharing stop message to the second electronic device 102 through short-range communication.

Figure 13:
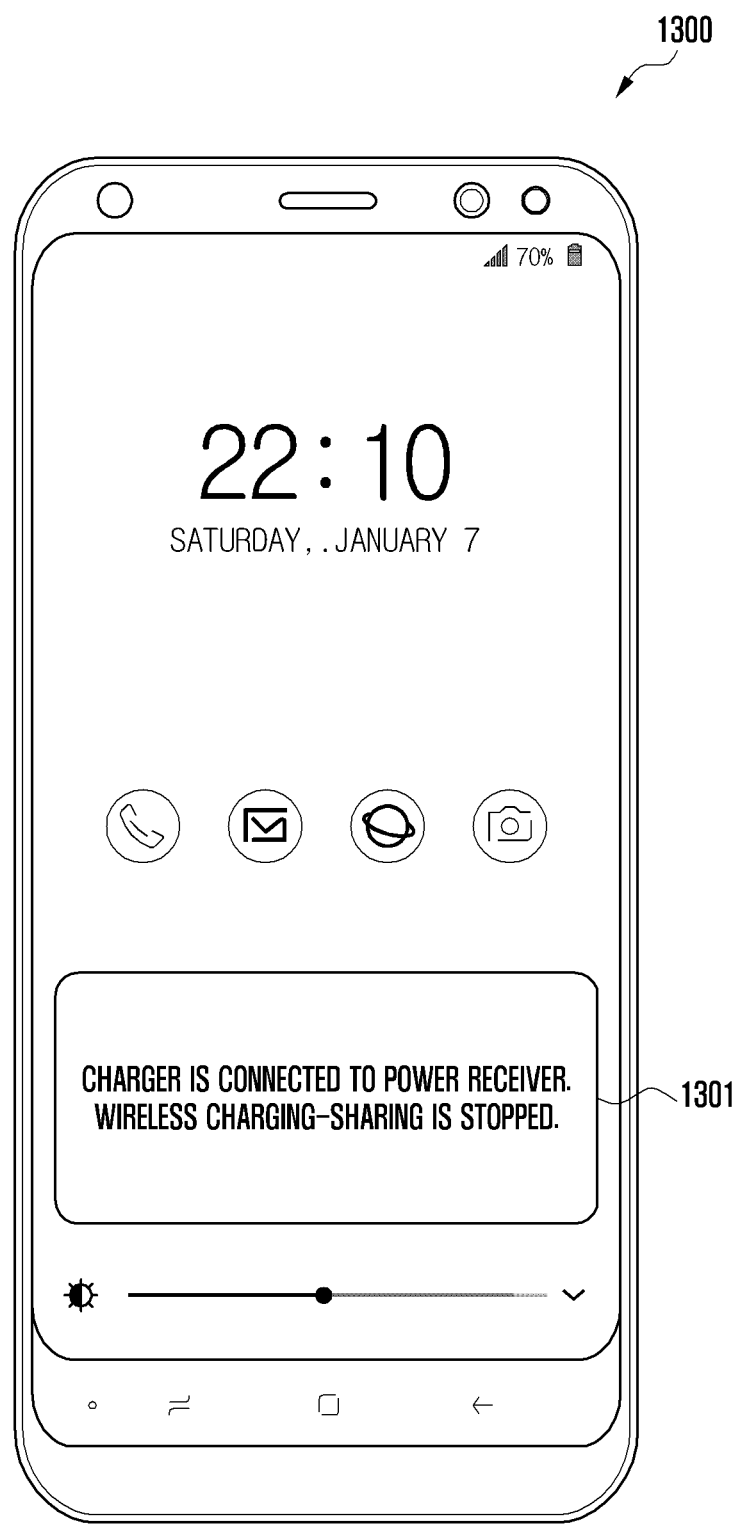
FIG. 13 is a view illustrating an example of a user interface associated with connection of a wired charger according to certain embodiments.

FIG. 13 is a view illustrating an example of a user interface associated with connection of a wired charger according to certain embodiments.

Referring to FIG. 13, a processor (e.g., the processor 120 in FIG. 1) of an electronic device (e.g., the electronic device 101 in FIG. 1) according to certain embodiments may provide a second user interface 1300 through a display (e.g., the display device 160 in FIG. 1), based on the connection of the wired charger. For example, when it is identified that the wired charger is connected to the second electronic device 102 that receives power from the electronic device 101, the processor 120 may provide a second user interface including a user notification 1301. The user notification 1301 may be provided in the form of a pop-up window and may include at least one of text, an image, or a video. The user notification 1301 may correspond to a notification indicating that the wired charger is connected to the second electronic device 102 that receives power from the electronic device 101 and thus the wireless charging-sharing is stopped. The processor 120 may provide a voice guidance corresponding to the user notification 1301 through a speaker (e.g., the sound output device 155 in FIG. 1).

Figure 14:
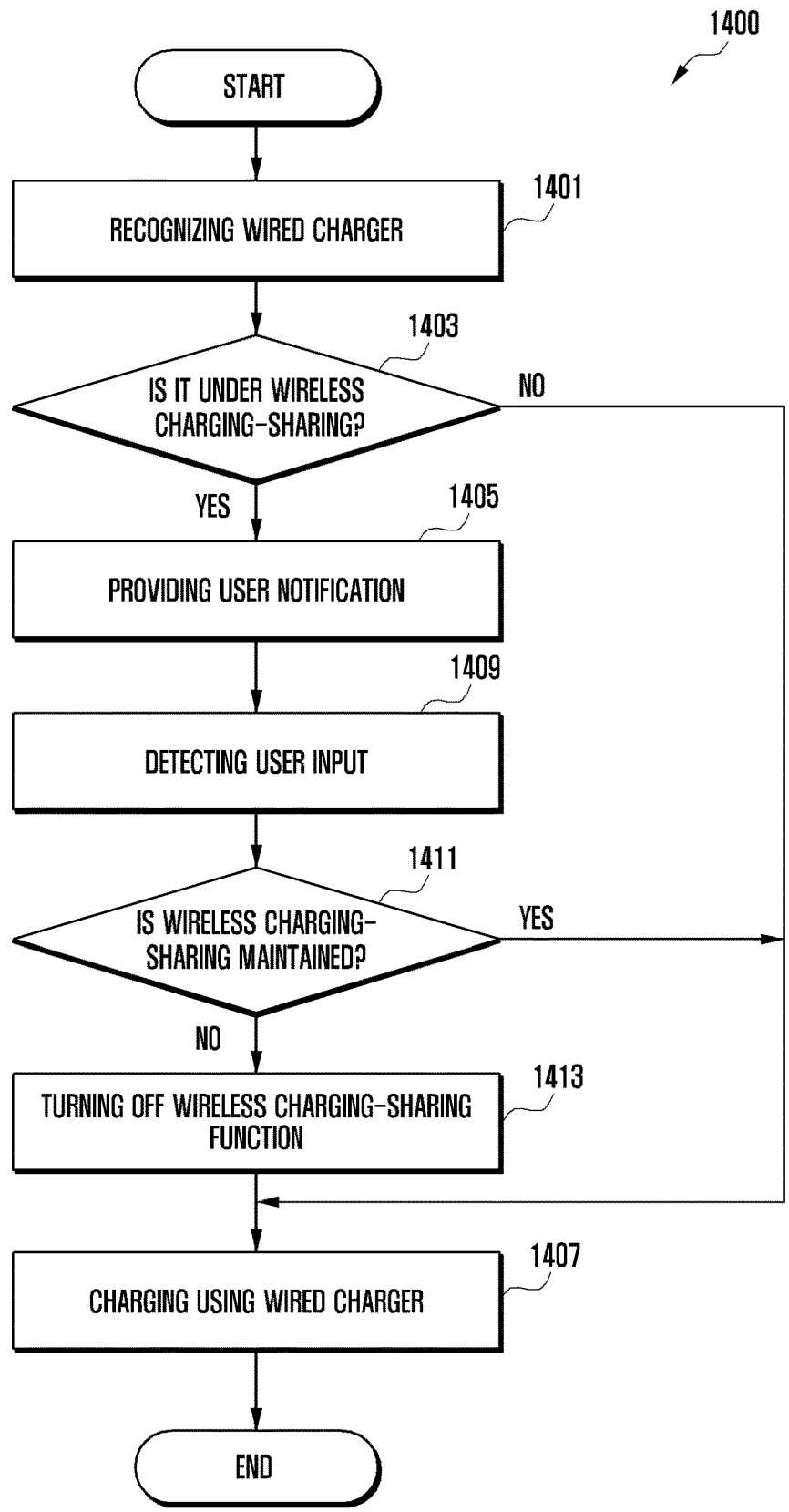
FIG. 14 is a flowchart 1400 illustrating an operation method according to connection of a wired charger in an electronic device that transmits power according to certain embodiments.

FIG. 14 is a flowchart 1400 illustrating an operation method according to connection of a wired charger in an electronic device that transmits power according to certain embodiments. The operation of FIG. 14 may an operation that is performed when the electronic device (e.g., the electronic device 101 in FIG. 1) according to certain embodiments operates in the wireless power Tx mode.

Referring to FIG. 14, in operation 1401, a processor (e.g., the processor 120 in FIG. 1) of an electronic device 101 may recognize a wired charger (e.g., the first external device 502 in FIG. 5) (or the wired charging device). The wired charger may be a device that is connected to the electronic device 101 in a wired manner and provides the electronic device 101 with power supplied from the outside (e.g., an outlet). The user may insert the interface of the wired charger into a connection terminal (e.g., the connection terminal 178) of the electronic device 101 so as to connect the electronic device 101 to the wired charger. When the interface of the wired charger is inserted into the connection terminal 178, the processor 120 may recognize the wired charger.

In operation 1403, the processor 120 may identify (or determine) whether it is presently operating under wireless charging-sharing. The wireless charging-sharing may mean that the electronic device 101 transmits wireless power to a second electronic (e.g., the second electronic device 102 in FIG. 1) using a coil (e.g., the coil 319 in FIG. 3). The electronic device 101 may operate in a wireless power TX mode in which the wireless charging-sharing function is turned on and the power stored in a battery (e.g., the battery 189 in FIG. 1) is transmitted to the second electronic device 102. The processor 120 may determine whether the electronic device 101 is under wireless charging-sharing, and may perform operation 1405 or operation 1407, based on the determination result. When it is under the wireless charging-sharing, the processor 120 may perform operation 1405, and when it is not under the wireless charging-sharing, the processor 120 may perform operation 1407.

When it is under the wireless charging-sharing (operation 1403—"YES"), in operation 1405, the processor 120 may provide a user notification. The user notification may be one for informing that at present, it is under wireless charging-sharing and the wired charger is connected. The first user notification may include at least one of text, an image, or a video. The processor 120 may include buttons for selecting whether to maintain the wireless charging-sharing or whether to stop the wireless charging-sharing in the user notification.

When it is not under the wireless charging-sharing (operation 1403—"NO"), in operation 1407, the processor 120 may perform charging using the wired charger. The processor 120 may charge a battery (e.g., the battery 189 in FIG. 1) with the power supplied from the wired charger.

In operation 1409, the processor 120 may detect a user input in response to the user notification. The user input may be one for selecting one of a button for maintaining wireless charging-sharing and a button for stopping wireless charging-sharing included in the user notification.

In operation 1411, the processor 120 may identify (or determine) whether to maintain the wireless charging-sharing or whether to stop wireless charging-sharing, based on the user input. When the user input for maintaining the wireless charging-sharing is detected (1411—"YES"), the processor 120 may perform operation 1407, and when the user input for stopping the wireless charging-sharing (operation 1411—"NO"), the processor 120 may perform operation 1413.

When maintaining the wireless charging-sharing, the processor 120 may perform operation 1407. The processor 120 may perform charging using the wired charger while maintaining the wireless charging-sharing. When the wireless charging-sharing and the charging through the wired charger are simultaneously performed, the processor 120 may simultaneously perform the charging of the battery 189 and power supply according to a wired/wireless charging rule. For example, the processor 120 may charge the battery 189 with a part of the power supplied from the wired charger and may transmit a remaining part of the supplied power to the second electronic device 102. Alternatively, the processor 120 may perform the charging first until the charged power of the battery 189 reaches a set value (e.g., 50%, 70%, or 80%), and may then supply the supplied power to the second electronic device 102. This is only an example to help understand the disclosure, and actual implementation may be applied differently.

When stopping the wireless charging-sharing, in operation 1413, the processor 120 may turn off the wireless charging-sharing function. The processor 120 may switch the wireless charging-sharing function from ON to OFF. When the wireless charging-sharing function is switched to OFF, the wireless charging-sharing may be stopped. The processor 120 may perform operation 1407 after turning off the wireless charging-sharing function. The processor 120 may perform charging using the wired charger after stopping the wireless charging-sharing.

According to certain embodiments, the processor 120 may transmit a power transmission stop message to the second electronic device 102 via a communication module (e.g., the communication module 190 in FIG. 1) through short-range communication, unlike the wireless power signal.

Figure 15:
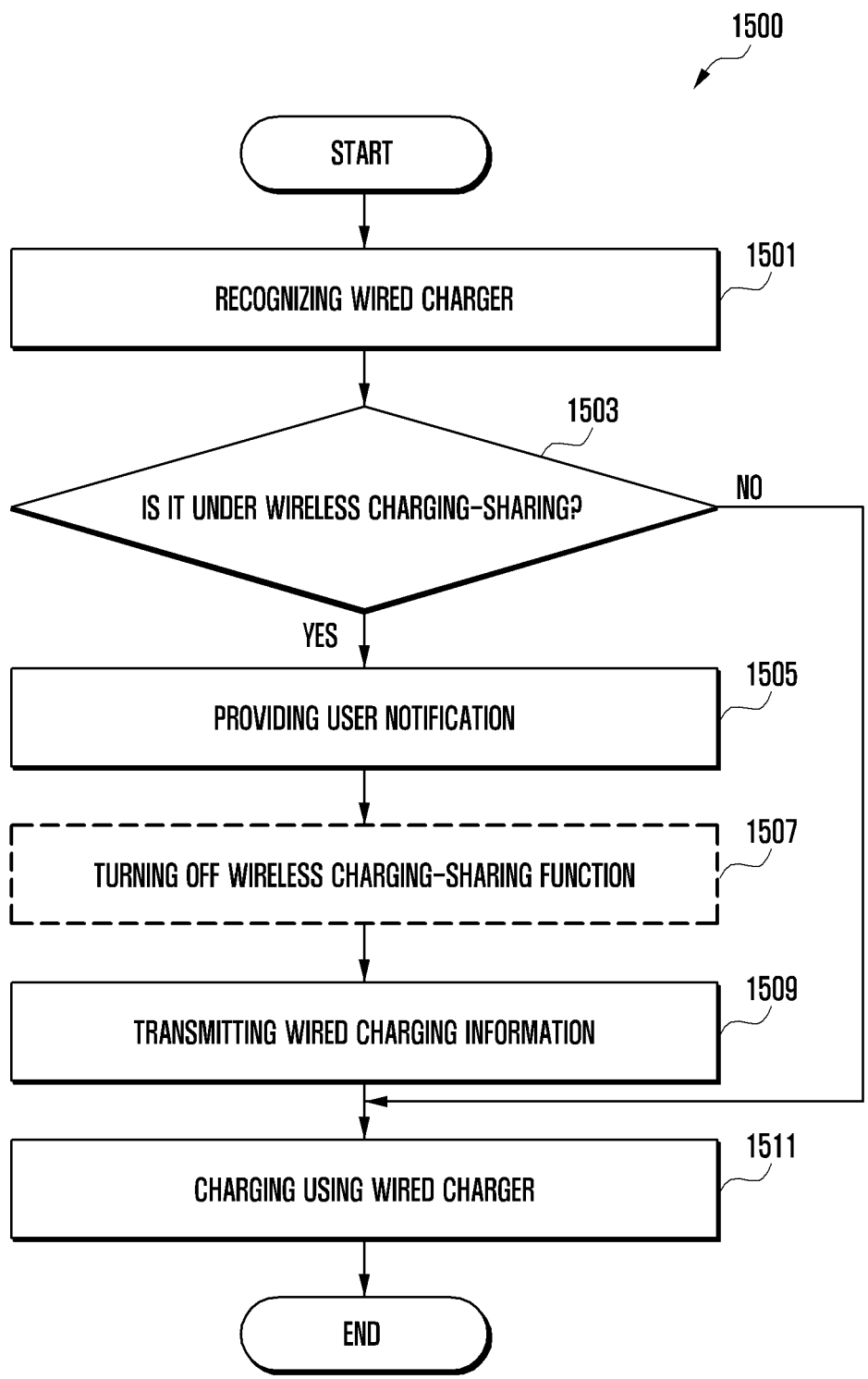
FIG. 15 is a flowchart 1500 illustrating an operation method according to connection of a wired charger in an electronic device that receives power according to certain embodiments.

FIG. 15 is a flowchart 1500 illustrating an operation method according to connection of a wired charger in an electronic device that receives power according to certain embodiments. The operation of FIG. 15 may an operation that is performed when the electronic device (e.g., the electronic device 101 in FIG. 1) according to certain embodiments operates in the wireless power Rx mode.

Referring to FIG. 15, in operation 1501, a processor (e.g., the processor 120 in FIG. 1) of an electronic device 101 may recognize a wired charger (e.g., the first external device 502 in FIG. 5). The wired charger may be a device that is connected to the electronic device 101 in a wired manner and provides the electronic device 101 with power supplied from the outside (e.g., an outlet). Since the recognition of a wired charger has been described in detail in operation 1401 of FIG. 14, a detailed description thereof may be omitted.

In operation 1503, the processor 120 may identify (or determine) whether it is under wireless charging-sharing. The wireless charging-sharing may mean that the electronic device 101 and a second electronic (e.g., the second electronic device 102 in FIG. 1) share wireless power. The electronic device 101 may operate in a wireless power RX mode in which the wireless charging-sharing function is turned on and the power is received from the second electronic device 102 via a coil (e.g., the first coil 319 in FIG. 3). When it is under the wireless charging-sharing, the processor 120 may perform operation 1505, and when it is not under the wireless charging-sharing, the processor 120 may perform operation 1511.

When it is under the wireless charging-sharing (operation 1503—"YES"), in operation 1505, the processor 120 may provide a user notification. The user notification may be one for informing that at present, it is under wireless charging and the wired charger is connected. The first user notification may include at least one of text, an image, or a video. The processor 120 may provide the user notification in the form of a pop-up window. According to certain embodiments, when the electronic device 101 operates in the wireless power Rx mode, the user notification may be different from the user notification provided in operation 1405 of FIG. 14. For example, the processor 120 may not provide a button associated with the control of wireless charging (e.g., maintaining or stopping charging) in the user notification provided in operation 1505.

In operation 1507, the processor 120 may turn off the wireless charging-sharing function. When it is under the wireless charging-sharing, the wireless charging-sharing function may be in the "ON" state. The processor 120 may switch the wireless charging-sharing function from ON to OFF. When the wireless charging-sharing function is switched to OFF, the wireless charging-sharing function may be stopped. According to certain embodiments, the electronic device 101 may be an electronic device capable of receiving wireless power. In this case, operation 1507 may be omitted. For example, after performing operation 1505, the processor 120 may perform operation 1509 without performing operation 1507.

In operation 1509, the processor 120 may transmit wired charging information to the second electronic device 102. The processor 120 may transmit, to the second electronic device 102, wired charging information indicating that the wired charger is connected. The processor 120 may transmit the wired charging information via a communication module (e.g., the communication module 190 in FIG. 1) through a short-range communication, unlike a wireless power signal.

When it is not under the wireless charging-sharing (operation 1503—"NO") or after performing operation 1509, the processor 120 may perform charging using the wired charger in operation 1511. The processor 120 may charge a battery (e.g., the battery 189 in FIG. 1) with the power supplied from the wired charger.

Figure 16:
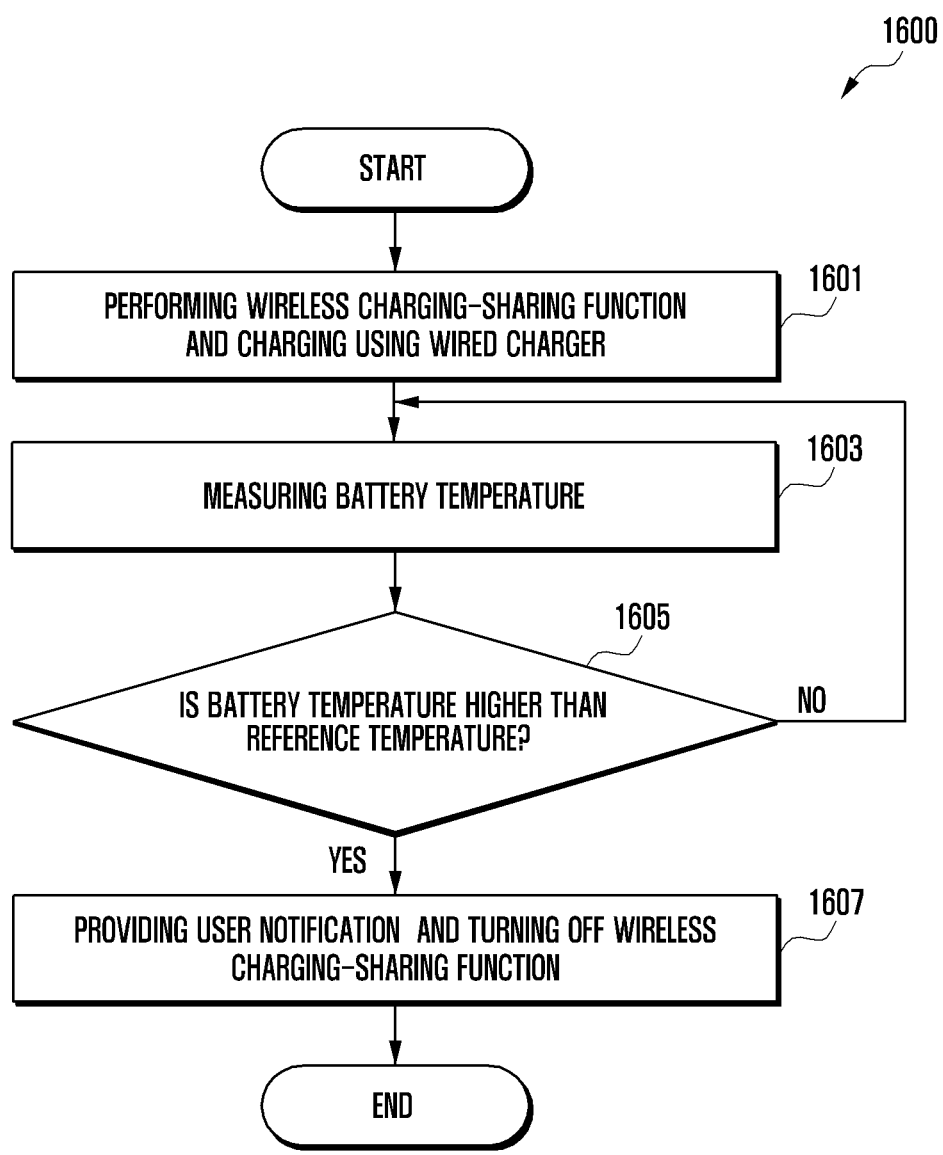
FIG. 16 is a flowchart 1600 illustrating an operation method according to connection of a wired charger and a battery temperature in an electronic device according to certain embodiments.

FIG. 16 is a flowchart 1600 illustrating an operation method according to connection of a wired charger and a battery temperature in an electronic device according to certain embodiments. The operation of FIG. 16 may an operation that is performed when the electronic device (e.g., the electronic device 101 in FIG. 1) according to certain embodiments operates in the wireless power Tx mode.

Referring to FIG. 16, in operation 1601, a processor (e.g., the processor 120 in FIG. 1) of an electronic device 101 may perform a wireless charge-sharing function and may perform charging through a wired charger (e.g., the first external device 502 in FIG. 5). For example, the processor 120 may charge a battery (e.g., the battery 189 in FIG. 1) with the power supplied from the wired charger simultaneously with supplying power to a second electronic device (e.g., the second electronic device 102 in FIG. 1). When the wireless charging-sharing and the charging through the wired charger are simultaneously performed, the processor 120 may simultaneously perform the charging of the battery 189 and power supply according to a wired/wireless charging rule. For example, the processor 120 may provide the second electronic device 102 with the power stored in the battery 189, and may charge the battery 189 with the power supplied from the wired charger. Alternatively, the processor 120 may provide the second electronic device 102 with a part of the power supplied from the wired charger, and may charge another battery 189 with the power supplied from the wired charger.

In operation 1603, the processor 120 may measure a battery temperature. For example, the processor 120 may measure the temperature of the electronic device 101 or the temperature of the battery 189 using the sensor module 176 of FIG. 1. When the wireless charging-sharing and the charging through the wired charger are performed at the same time, the temperature of the electronic device 101 (or battery temperature) may increase or decrease. The processor 120 may periodically or selectively measure the battery temperature or the temperature of the electronic device 101. Hereinafter, a case in which the battery temperature increases is described as an example for convenience of description, but, even when the battery temperature decreases, the electronic device 101 may operate in a manner, which is the same as or similar to that in the case in which the battery temperature increases.

In operation 1605, the processor 120 may identify (or determine) whether the battery temperature is higher than the reference temperature. The reference temperature may be set by default in the electronic device 101 or may be set by the user. The processor 120 may set the reference temperature, based on the malfunction or the wireless charging-sharing function of the electronic device 101. When the battery temperature is higher than the reference temperature, the processor 120 may perform operation 1607, and when the battery temperature is equal to or lower than the reference temperature (operation 1605—"NO"), the processor 120 may return to operation 1603. The processor 120 may return to operation 1603 and may continuously measure and monitor the battery temperature.

When the battery temperature is higher than the reference temperature (operation 1605—"YES"), in operation 1607, the processor 120 may provide a user notification and may turn off the wireless charging-sharing function. The user notification may include a notification indicating that the wireless charging-sharing is stopped. The first user notification may include at least one of text, an image, or a video. The user notification may be the same as or similar to the first user notification of FIG. 9.

Figure 17:
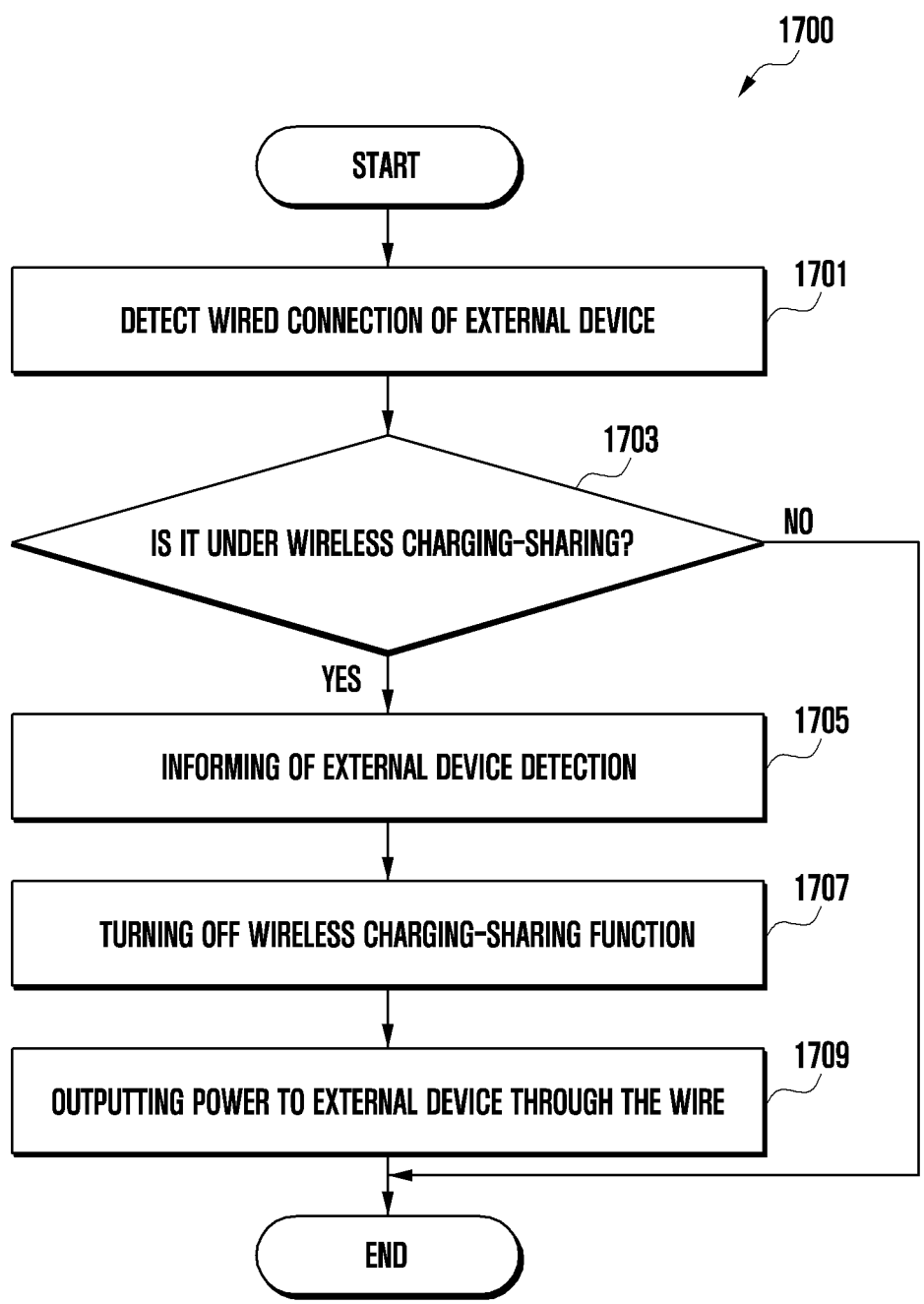
FIG. 17 is a flowchart 1700 illustrating a method of controlling a wireless charging-sharing function according to detection of an external device in an electronic device according to certain embodiments.

FIG. 17 is a flowchart 1700 illustrating a method of controlling a wireless charging-sharing function according to detection of an external device in an electronic device according to certain embodiments. The operation of FIG. 17 may an operation that is performed when the electronic device (e.g., the electronic device 101 in FIG. 1) according to certain embodiments operates in the wireless power Tx mode.

Referring to FIG. 17, in operation 1701, a processor (e.g., the processor 120 in FIG. 1) of an electronic device 101 may detect (or recognize) an external device (e.g., the first external device 502 in FIG. 5). The external device may be connected to the electronic device 101 in a wired manner, and operate by receiving power supplied from the electronic device 101 (e.g., an on-the-go or "OTG" device). When the interface of the external device is inserted into an external connection terminal (e.g., the external connection terminal 303 or 304 in FIG. 3) of the electronic device 101, the processor 120 may detect the external device.

In operation 1703, the processor 120 may identify (or determine) whether it is operation under a wireless charging-sharing state. The wireless charging-sharing state may indicating that the electronic device 101 is sharing wireless power with a second electronic (e.g., the second electronic device 102 in FIG. 1) through its coil (e.g., the first coil 319 in FIG. 3). The electronic device 101 may operate in a wireless power TX mode in which the wireless charging-sharing function is turned on and the power stored in a battery (e.g., the battery 189 in FIG. 1) is transmitted to the second electronic device 102 through the first coil 319. When it is under the wireless charging-sharing state, the processor 120 may perform operation 1705, and when it is not under the wireless charging-sharing, the processor 120 may perform operation 1711.

When it is under the wireless charging-sharing (operation 1703—"YES"), in operation 1705, the processor 120 may provide a notification indicating that the external device is detected. The external device detection notification may be one for informing that at present, it is under a wireless charging-sharing state and an external device that is drawing power is connected. The external device detection notification may include at least one of text, an image, or a video.

In operation 1707, the processor 120 may turn off the wireless charging-sharing function. The processor 120 may switch the wireless charging-sharing function from ON to OFF. When the wireless charging-sharing function is switched to OFF, the wireless charging-sharing function may be stopped. In operation 1709, power may be output to the external device through the connected wire after disabling wireless charging-sharing.

When the electronic device 101 is not operating under the wireless charging-sharing (operation 1703—"NO"), in operation 1709, the processor 120 may output the power stored in the battery 189 to the external device through the wired connection. The processor 120 may supply power to the external device so as to facilitate wired-operation of the external device.

Figure 18:
FIG. 18 is a view illustrating an example of a user interface associated with connection or an external device according to certain embodiments.

FIG. 18 is a view illustrating an example of a user interface associated with connection of an external device according to certain embodiments.

Referring to FIG. 18, a processor (e.g., the processor 120 in FIG. 1) of an electronic device (e.g., the electronic device 101 in FIG. 1) according to certain embodiments may provide a third user interface 1800 through a display (e.g., the display device 160 in FIG. 1), based on the detection (or connection) of an external device. For example, when the connection of an external device, which operates using the power of the electronic device 101 during wireless charging-sharing, is detected, the processor 120 may provide a third user interface 1800 including a user notification 1801. The user notification 1801 may be provided in the form of a pop-up window and may include at least one of text, an image, or a video. The user notification 1801 may correspond to a notification indicating that the wireless charging-sharing is stopped since an external device is connected. The processor 120 may provide a voice guidance corresponding to the user notification 1801 through a speaker (e.g., the sound output device 155 in FIG. 1).

Figure 19:
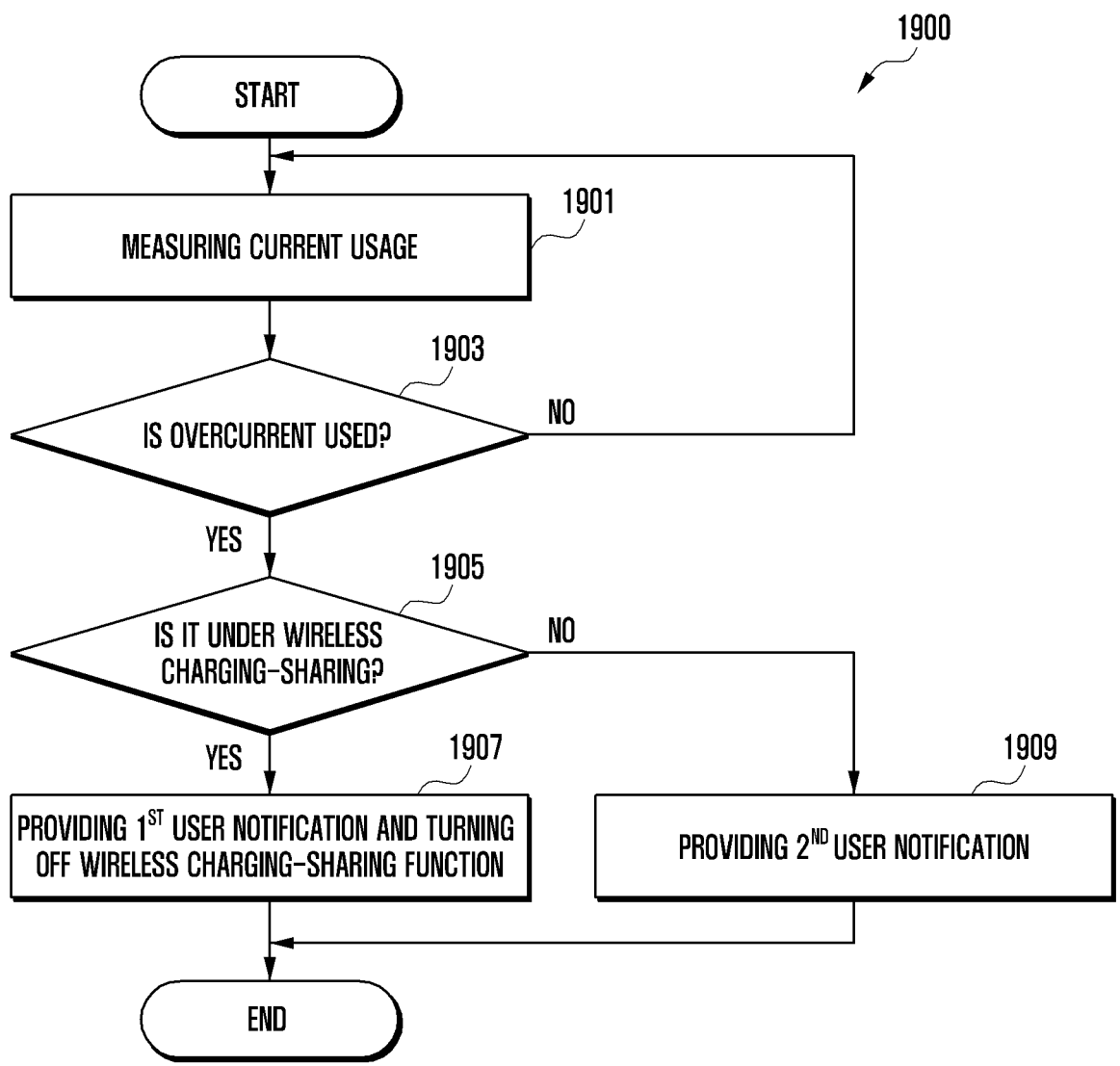
FIG. 19 is a flowchart 1900 illustrating a method of controlling a wireless charging-sharing function according to detection of overcurrent in an electronic device according to certain embodiments.

FIG. 19 is a flowchart 1900 illustrating a method of controlling a wireless charging-sharing function according to detection of overcurrent in an electronic device according to certain embodiments. Operations of FIG. 19 may be performed regardless whether the electronic device (e.g., the electronic device 101 in FIG. 1) according to certain embodiments operates in the wireless power Tx mode or operates in the wireless power Rx mode.

Referring to FIG. 19, in operation 1901, a processor (e.g., the processor 120 in FIG. 1) of the electronic device 101 may measure current usage. The processor 120 may measure the current usage of the electronic device 101 using a power management module (e.g., the power management module 188 in FIG. 1) of the electronic device 101. The processor 120 may continuously monitor the use of overcurrent in order to protect the electronic device 101.

In operation 1903, the processor 120 may identify (or determine) whether an overcurrent state is detected. The overcurrent state may be caused by at least one of luminance brightness of a display (e.g., the display device 160 in FIG. 1), execution of some applications (e.g., a game application), or execution of some functions. When the overcurrent state is detected (operation 1903—"YES"), the processor 120 may perform operation 1905, and when the overcurrent state is not detected (operation 1903—"NO"), the processor 120 may return to operation 1901. The processor 120 may return to operation 1901 and may continuously monitor for the overcurrent state.

When the overcurrent is detected (operation 1903—"YES"), in operation 1905, the processor 120 may identify (or determine) whether or not it is under wireless charging-sharing. The wireless charging-sharing may indicate the state in which the electronic device 101 performs a wireless charging-sharing function as in operation 801 in FIG. 8. When it is under the wireless charging-sharing (operation 1905—"YES"), the processor 120 may perform operation 1907, and when it is not under the wireless charging-sharing (operation 1905—"NO"), the processor 120 may perform operation 1911.

When it is under the wireless charging-sharing, in operation 1907, the processor 120 may provide a first user notification and may turn off the wireless charging-sharing function. The first user notification may include a notification indicating that the wireless charging-sharing is stopped due to overcurrent (or for the protection of the electronic device 101). When excessive current is used, the electronic device 101 may be overloaded so that the power source of the electronic device 101 may be turned off. In order to prevent this, the first user notification may be one for asking the user to refrain from using excessive current. The first user notification may be the same as or similar to the first user notification of FIG. 9. In addition, the processor 120 may turn off the wireless charging-sharing function so as to stop the execution of the wireless charging-sharing function.

When it is not under the wireless charging-sharing, in operation 1909, the processor 120 may provide a second user notification. The processor 120 may provide the second user notification through the display device 160 or the sound output device 155. The second user notification may be different from the first user notification.

Figure 20:
FIG. 20 is a view illustrating an example of a user interface associated with detection of overcurrent according to certain embodiments.

FIG. 20 is a view illustrating an example of a user interface associated with detection of overcurrent according to certain embodiments.

Referring to FIG. 20, a processor (e.g., the processor 120 in FIG. 1) of an electronic device (e.g., the electronic device 101 in FIG. 1) according to certain embodiments may provide a fourth user interface 2000 through a display (e.g., the display device 160 in FIG. 1), based on the use of overcurrent. The user notification 2001 may be provided in the form of a pop-up window and may include at least one of text, an image, or a video. The user notification 2001 may correspond to a notification indicating that the wireless charging-sharing is stopped since use of overcurrent is detected in the electronic device 101. The processor 120 may provide a voice guidance corresponding to the user notification 2001 through a speaker (e.g., the sound output device 155 in FIG. 1).

Figure 21:
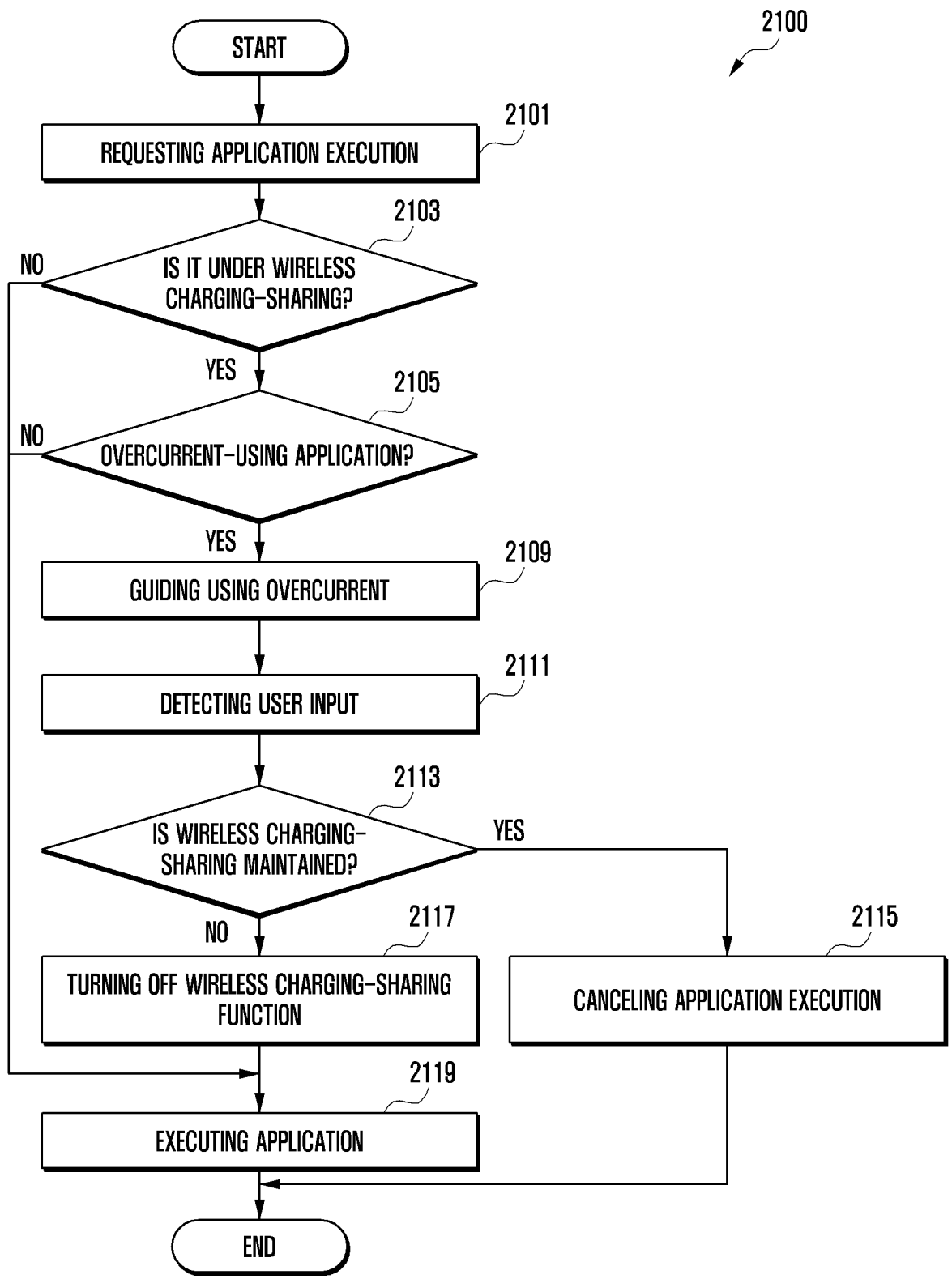
FIG. 21 is a flowchart 2100 illustrating a method of controlling a wireless charging-sharing function according to execution of an application in an electronic device according to certain embodiments.

FIG. 21 is a flowchart 2100 illustrating a method of controlling a wireless charging-sharing function according to execution of an application in an electronic device according to certain embodiments, Operations of FIG. 21 may be performed regardless whether the electronic device (e.g., the electronic device 101 in FIG. 1) according to certain embodiments operates in the wireless power Tx mode or operates in the wireless power Rx mode.

Referring to FIG. 21, in operation 2101, a processor (e.g., the processor 120 in FIG. 1) of the electronic device 101 may receive an application execution request. The processor 120 may receive an application execution request from the user through an input device (e.g., the input device 150 in FIG. 1). For example, the user may select an icon to be executed among application icons displayed on a home screen of the electronic device 101 or may select one application from a recent execution list. The application may be associated with any one of a telephone, a text, a messenger, the Internet, and a game.

In operation 2103, the processor 120 may identify (or determine) whether it is under wireless charging-sharing. The wireless charging-sharing may be related to whether the electronic device 101 shares power with a second electronic (e.g., the second electronic device 102 in FIG. 1). For example, the wireless charging-sharing may mean the state in which the electronic device 101 performs a wireless charging-sharing function as in operation 801 in FIG. 8. When it is under the wireless charging-sharing (operation 2103—"YES"), the processor 120 may perform operation 2105, and when it is not under the wireless charging-sharing (operation 2103—"NO"), the processor 120 may perform operation 2107.

When it is under the wireless charging-sharing (operation 2103—"YES"), in operation 2105, the processor 120 may identify (or determine) whether or not the application requested to be executed is an overcurrent-using application. The overcurrent-using application may mean an application that may rapidly increase the current usage of at least one resource (e.g., the processor 120) of the electronic device 101. For example, some game applications may be overcurrent-using applications in the electronic device 101. When the application requested to be executed in operation 2101 is an overcurrent-using application (operation 2105—"YES"), the processor 120 may perform operation 2109, and when the application requested to be executed is not an overcurrent-using application (operation 2105—"NO"), the processor 120 may perform operation 2107.

When it is not under the wireless charging-sharing (2103—"NO"), or when the application requested to be executed is not an overcurrent-using application (2105—"NO"), in operation 2107, the processor 120 may execute the application. The application may be one requested to be executed in operation 2101. The processor 120 may provide a screen associated with the executed application through a display (e.g., the display device 160 in FIG. 1).

When the application requested to be executed is an overcurrent-using application (operation 2105—"YES"), in operation 2109, the processor 120 may guide the use of overcurrent through a user interface. The processor 120 may inform the user of the fact that the execution of the overcurrent-using application is requested during the wireless charging-sharing. The processor 120 may guide the use of overcurrent by displaying an interface in the form of a pop-up window through a display (e.g., the display device 160 in FIG. 1). The processor 120 may include in the interface buttons for selecting whether to maintain the wireless charging-sharing or whether to stop the wireless charging-sharing when guiding the use of overcurrent.

In operation 2111, the processor 120 may detect a user input. The user input may select one of the buttons for maintaining wireless charging-sharing and the button for stopping wireless charging-sharing included in the overcurrent use guidance.

In operation 2113, the processor 120 may identify (or determine) whether to maintain the wireless charging-sharing or whether to stop wireless charging-sharing, based on the user input. When the user input of selecting the button for maintaining the wireless charging-sharing is detected (2113—"YES"), the processor 120 may perform operation 2115, and when the user input of selecting the button for stopping the wireless charging-sharing (operation 2113—"NO"), the processor 120 may perform operation 2119.

When the wireless charging-sharing is maintained (operation 2113—"YES"), in operation 2115, the processor 120 may cancel the execution of the application. The processor 120 may not execute the application requested to be executed in operation 2101 when the wireless charging-sharing is maintained. The processor 120 may cancel the execution of an application that interferes with the wireless charging-sharing. The processor 120 may inform the user of the fact that the execution of the application is canceled. According to certain embodiments, the processor 120 may maintain the wireless charging-sharing as the execution of the application is canceled. The processor 120 may maintain the wireless charging-sharing as no overcurrent-using application is executed. The processor 120 may inform the user of the fact that the wireless charge sharing is maintained.

When stopping the wireless charging-sharing (operation 2113—"NO"), in operation 2117, the processor 120 may turn off the wireless charging-sharing function. The processor 120 may switch the wireless charging-sharing function from ON to OFF. When the wireless charging-sharing function is switched to OFF, the wireless charging-sharing function may be stopped.

The processor 120 may perform operation 2117, and may execute the application requested to be executed in operation 2119. The processor 120 may execute the application requested to be executed in operation 2119 by stopping the wireless charging-sharing that interferes with the use of overcurrent.

Figure 22:
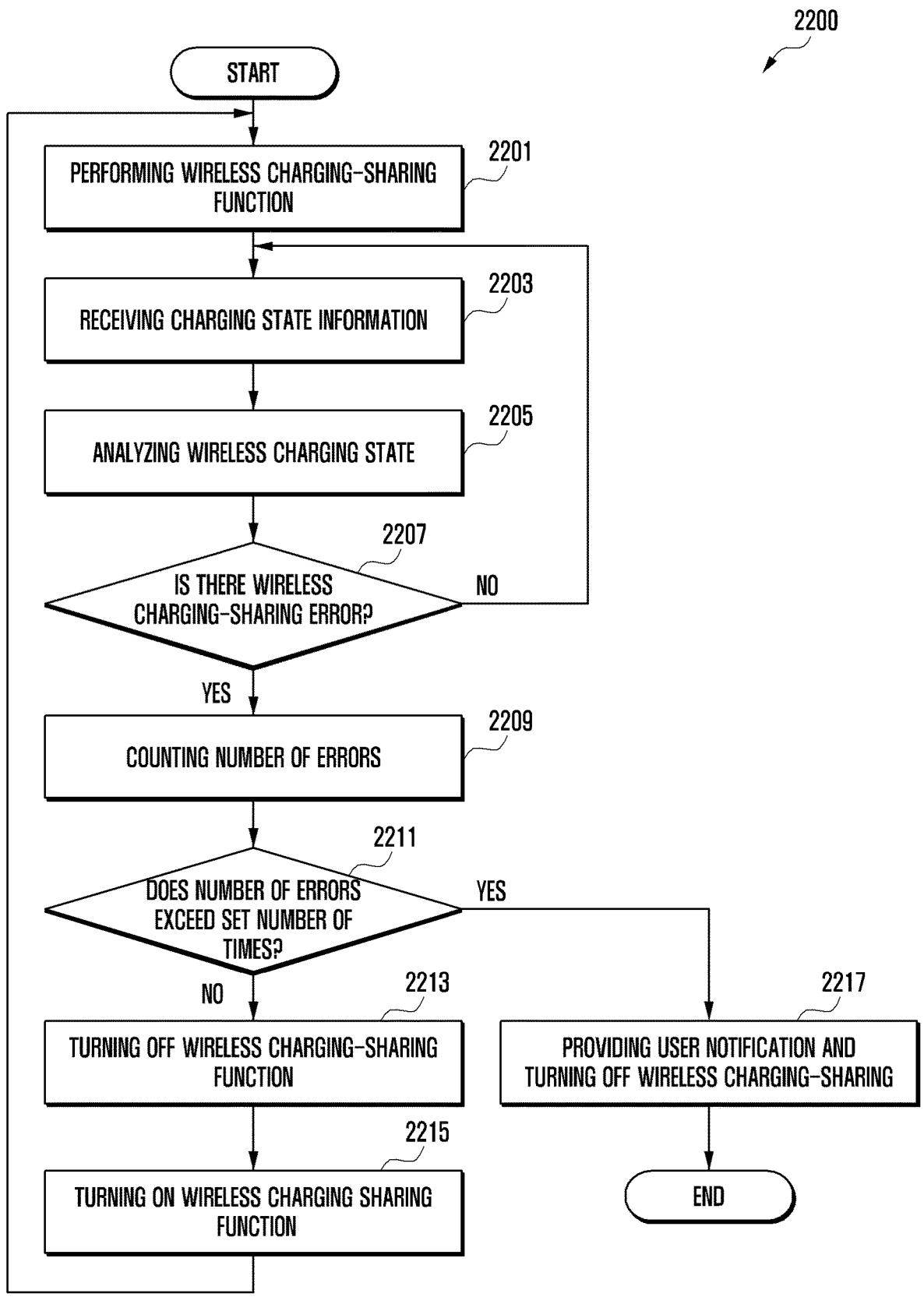
FIG. 22 is a flowchart 2200 illustrating an operation method according to a wireless charging-sharing error in an electronic device according to certain embodiments.

FIG. 22 is a flowchart 2200 illustrating an operation method according to a wireless charging-sharing error in an electronic device according to certain embodiments. The operation of FIG. 22 may an operation that is performed when the electronic device (e.g., the electronic device 101 in FIG. 1) according to certain embodiments operates in the wireless power Tx mode.

Referring to FIG. 22, in operation 2201, a processor (e.g., the processor 120 in FIG. 1) of the electronic device 101 may perform a wireless charging-sharing function. The wireless charging-sharing function may be a function of sharing the power stored in the battery (e.g., the battery 189) of the electronic device 101 with a second electronic device (e.g., the second electronic device 102 in FIG. 1). The processor 120 may transmit the power stored in the battery (e.g., the battery 189) of the electronic device 101 to the second electronic device (e.g., the second electronic device 102 in FIG. 1).

In operation 2203, the processor 120 may receive charging state information from the second electronic device 102. The charging state information corresponds to the charging situation of the second electronic device 102 and may include, for example, a charging amount. During the wireless charging-sharing, the processor 120 may receive the charging state information via a communication module (e.g., the communication module 190 in FIG. 1) through a short-range communication, unlike a wireless power signal. The processor 120 may periodically or selectively receive the charging state information.

In operation 2205, the processor 120 may analyze the wireless charging state, based on the charging state information. For example, the processor 120 may analyze the wireless charging state, based on at least one of information on a time at which the wireless charging-sharing is started, charging current information, or the charging state information. The processor 120 may estimate the charging amount that should be charged to the second electronic device 102 from the time point at which sharing is started to the present, based on the current (or voltage) transmitted to the second electronic device 102. The processor 120 may analyze whether the estimated charging amount corresponds to the charging amount included in the charging state information.

In operation 2207, the processor 120 may identify (or determine) whether an error has occurred in the execution of wireless charging-sharing. The processor 120 may determine whether there is a charging error, based on whether the estimated charging amount corresponds to the charging amount included in the charging state information. The processor 120 may determine that there is no charging error when the estimated charging amount corresponds to the charging amount included in the charging state information. The processor 120 may determine that an error occurs in the wireless charging-sharing when the estimated charging amount is greater than the charging amount included in the charging state information. When an error occurs in the wireless charging-sharing (operation 2207—"YES"), the processor 120 may perform operation 2209, and when no error occurs in the wireless charging-sharing (operation 2207—"NO"), the processor 120 may return to operation 2203. The processor 120 may return to operation 2203 and may periodically or selectively monitor whether there is an error in the wireless charging-sharing.

According to certain embodiments, the processor 120 may monitor charging current or a ping step, based on the charging state information. For example, wireless charging according to the wireless power consortium (WPC) standard may include a ping step, an identification and configuration step, or a power transfer step. The ping step may be a step of determining whether a wireless power receiver (e.g., the second electronic device 102) is placed on the wireless charging supply device (or a wireless charging pad). For example, the ping step may be a step of determining whether the electronic device 101 is close to the second electronic device 102 (e.g., the wearable device 602 in FIG. 6A). The processor 120 may perform a stable wireless charging-sharing function by periodically or selectively monitoring whether there is an error in the wireless charging-sharing.

When an error occurs in the wireless charging-sharing (operation 2207—"YES"), in operation 2209, the processor 120 may count the number of errors. The processor 120 may count the number of errors each time the operation 2209 is performed, and may store (or accumulate) the counted number of errors in the memory (e.g., the memory 130) of the electronic device 101.

In operation 2211, the processor 120 may identify (or determine) whether the number of errors exceeds a set number of times. The set number of times (e.g., 3 times or 5 times) may be set by default in the electronic device 101 in connection with the wireless charging-sharing, or may be set by a user. When the number of errors is equal to or smaller than the set number of times (operation 2211—"NO"), the processor 120 may perform operation 2213, and when the number of errors exceeds the set number of times (operation 2211—"YES"), the processor 120 performs operation 2217.

When the number of errors is equal to or smaller than the set number of times (operation 2211—"NO"), in operation 2213, the processor 120 may turn off the wireless charging-sharing function. Since the wireless charging-sharing function is turned on by operation 2201, the processor 120 may switch the wireless charging-sharing function from "ON" to "OFF".

In operation 2215, the processor 120 may turn on the wireless charging-sharing function. Since the wireless charging-sharing function is turned off by operation 2213, the processor 120 may switch the wireless charging-sharing function from "OFF" to "ON". The processor 120 may turn on the wireless charging-sharing function after a predetermined time (e.g., 3 sec, 5 sec, or 10 sec) after turning off the wireless charging-sharing function. The processor 120 may re-execute (or re-perform) the wireless charging-sharing function by switching the wireless charging-sharing function from OFF to ON. The processor 120 may return to operation 2201 after turning on the wireless charging-sharing function. The processor 120 may return to operation 2201 and may perform the wireless charging-sharing and may monitor whether there is an error in the wireless charging-sharing.

When the number of errors exceeds the set number of times (operation 2211—"YES"), in operation 2217, the processor 120 may provide a user notification and may turn off the wireless charging-sharing function. The user notification may be one for informing that there is an error in the wireless charging-sharing. In addition, the user notification may be for informing that since there is an error in the wireless charging-sharing, the wireless charging-sharing is stopped in order to prevent power loss of the electronic device 101 or the second electronic device 102. The user notification may include at least one of text, an image, or a video. The processor 120 may provide the user notification through a display (e.g., the display device 160 in FIG. 1) or a speaker (e.g., the sound output device 155 in FIG. 1). In addition, the processor 120 may turn off the wireless charging-sharing function so as to stop the execution of the wireless charging-sharing function.

According to certain embodiments, the wireless charging-sharing error may occur when the wireless charging areas do not correspond each other (e.g., misalign) between the electronic device 101 and the second electronic device 102. For example, when the size of the electronic device 101 that supplies power is different from the size of the second electronic device 102 that receives power, the electronic devices may be located in the state in which the wireless charging areas are not correspond to each other. When the second electronic device 102 that receives power is a wearable device 602 as illustrated in FIG. 6A, the wireless power transmission area of the electronic device 101 that supplies power and the wireless power reception area of the wearable device 602 may not exactly correspond to each other. The wireless charging-sharing error may occur when the power received by the second electronic device 102 is lower than the power transmitted by the electronic device 101. The wireless charging-sharing error may mean that there is a lot of power loss. The user may check the wireless charging-sharing error through the user notification. Accordingly, the user may adjust the position of the electronic device 101 or the second electronic device 102 such that the wireless charging areas of the electronic device 101 and the second electronic device 102 correspond to each other. After the position adjustment, the wireless charging-sharing function may be turned on by the user. When the wireless charging-sharing is turned on, the processor 120 may perform operation 2201.

Figure 23A:
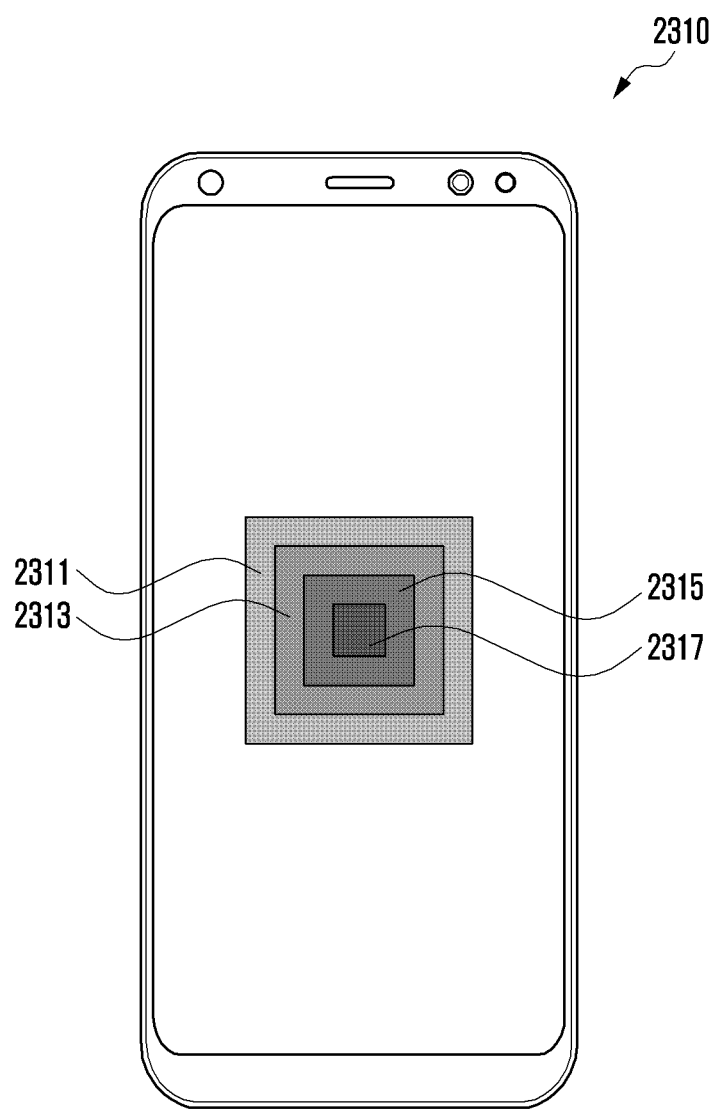
FIG. 23A is a view illustrating an example of a user interface associated with a wireless charging-sharing error according to certain embodiments.
Figure 23B:
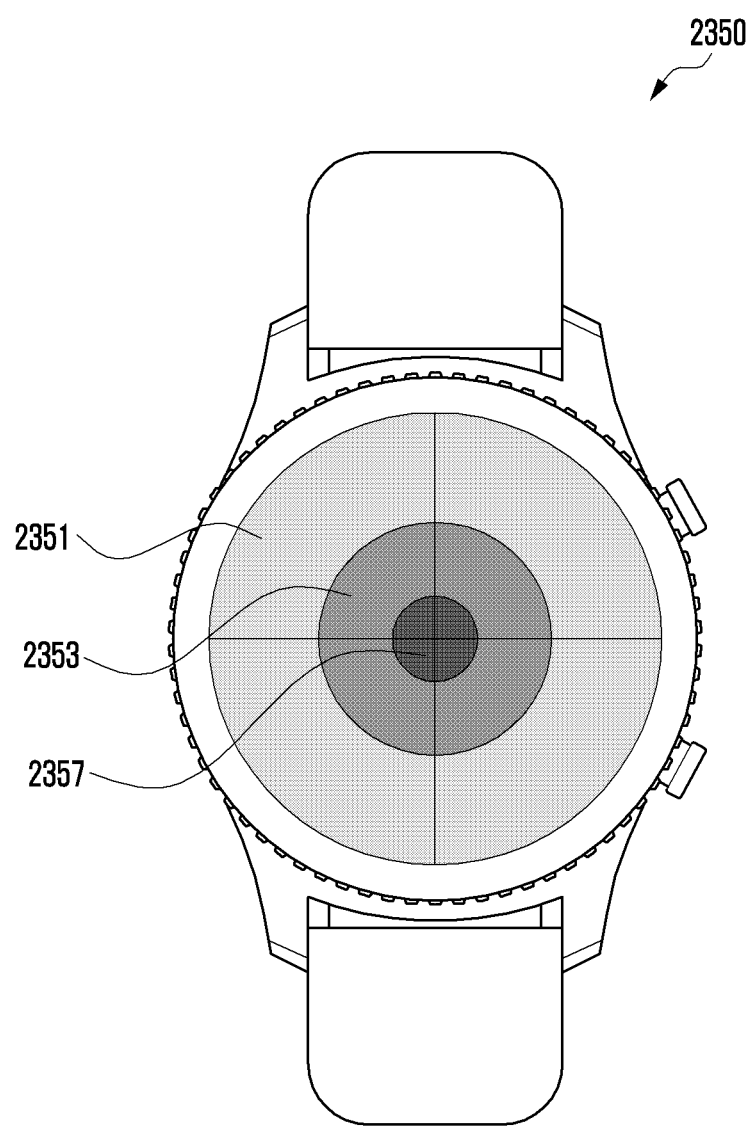
FIG. 23B is a view illustrating an example of a user interface associated with a wireless charging-sharing error according to certain embodiments.

FIG. 23A is a view illustrating an example of a user interface associated with a wireless charging-sharing error according to certain embodiments, and FIG. 23B is a view illustrating an example of a user interface associated with a wireless charging-sharing error according to certain embodiments.

FIG. 23A illustrates an example of providing a user interface associated with a wireless charging-sharing error in an electronic device (e.g., the electronic device 101 of FIG. 1) according to certain embodiments.

Referring to FIG. 23A, when a wireless charging error is detected, a processor (e.g., the processor 120 in FIG. 1) of the electronic device 101 may provide a first user interface 2310 through a display (e.g., the display device 160 in FIG. 1). The processor 120 may perform the operations included in FIG. 22 so as to detect a wireless charging error. The wireless charging error may be related to a situation in which another electronic device (e.g., the second electronic device 102 in FIG. 1) that is performing wireless charging-sharing is disconnected or in which the second electronic device 102 is maintained in the connected state. When a wireless charging error is detected, the processor 120 may provide a connection state with the second electronic device 102 in connection with the wireless charging-sharing before turning off the wireless charging-sharing function. The user may check the connection state and may change the position of the electronic device 101 or the second electronic device 102 such that the wireless charging areas are aligned (e.g., center-aligned) between the electronic device 101 and the second electronic device 102.

The processor 120 may provide a first user interface 2310 including a wireless charging area corresponding a voltage level range, based on the power (e.g., battery sharing power) provided to the second electronic device 102 by the electronic device 101. The first user interface 2310 may include a first wireless charging area 2311, a second wireless charging area 2313, a third wireless charging area 2315, or a fourth wireless charging area 2317. The first wireless charging area 2311 may represent an area in which the electronic device 101 is capable of recognizing another electronic device 102 (e.g., the wearable device 602 in FIGS. 6A and 6B). The second wireless charging area 2313 may represent an area in which the electronic device 101 is capable of supplying power to another electronic device 102 (e.g., the wearable device (e.g., the wearable device 602)). The third wireless charging area 2315 may correspond to the battery sharing power lower than a predetermined power value (e.g., 4.5V). The fourth wireless charging area 2317 may correspond to the battery sharing power equal to or higher than a predetermined power value (e.g., 4.5V). The user may change the position of the electronic device 101 or the second electronic device 102 while viewing the areas indicated on the first user interface 2310 such that the wireless charging areas are aligned (e.g., center-aligned) between the electronic device 101 and the second electronic device 102.

FIG. 23B illustrates an example of providing a user interface associated with a wireless charging-sharing error in an electronic device (e.g., the wearable device 602 in FIGS. 6A and 6B) according to certain embodiments.

Referring to FIG. 23B, when a wireless charging error is detected, a processor (e.g., the processor 120 in FIG. 1) of the electronic device 602 may provide a second user interface 2350 through a display (e.g., the display device 160 in FIG. 1). The wearable processor 602 may perform the operations included in FIG. 22 so as to detect a wireless charging error. The wearable device 602 may provide the second user interface 2350 including a wireless charging area corresponding a voltage level range, based on the power (e.g., battery sharing power) received from the electronic device 101 (e.g., the electronic device 101). The second user interface 2350 may include a first wireless charging area 2351, a second wireless charging area 2353, or a third wireless charging area 2355. The first wireless charging area 2351 may represent an area in which the wearable device 602 is capable of recognizing the electronic device 101. The second wireless charging area 2353 may correspond to the battery sharing power lower than a predetermined power value (e.g., 4.5V). The third wireless charging area 2357 may correspond to the battery sharing power equal to or higher than a predetermined power value (e.g., 4.5V). The user may change the position of the wearable device 602 or the electronic device 101 while viewing the areas indicated on the second user interface 2350 such that the wireless charging areas are aligned (e.g., center-aligned) between the wearable device 602 and the electronic device 101.

Figure 24:
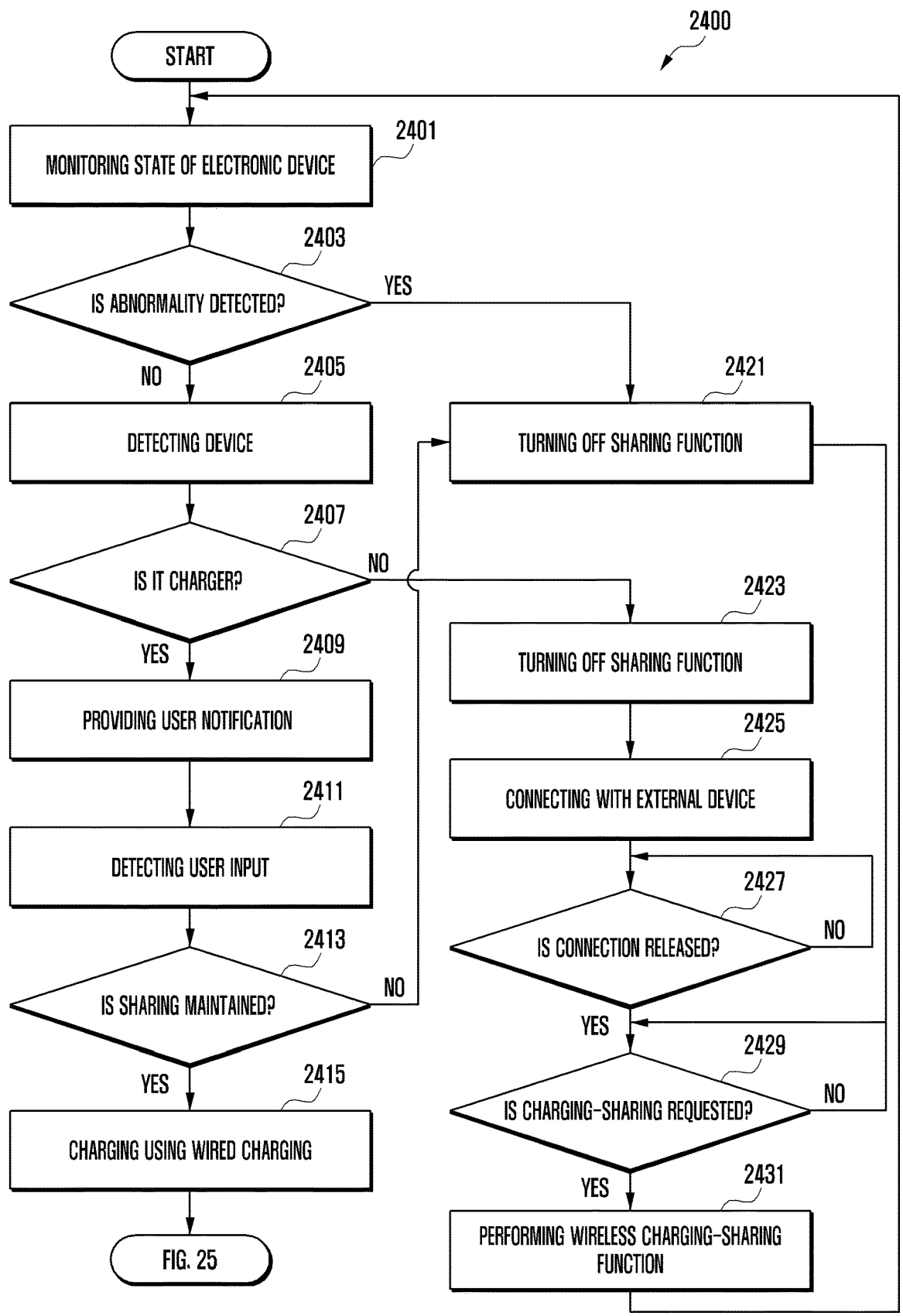
FIG. 24 is a flowchart 2400 illustrating an operation method according to the state of an electronic device and connection of an external device in the electronic device according to certain embodiments.

FIG. 24 is a flowchart 2400 illustrating an operation method according to the state of an electronic device and connection of an external device in the electronic device according to certain embodiments. The operation of FIG. 24 may an operation that is performed when the electronic device (e.g., the electronic device 101 in FIG. 1) according to certain embodiments operates in the wireless power Tx mode.

Referring to FIG. 24, in operation 2401, a processor (e.g., the processor 120 in FIG. 1) of the electronic device 101 may monitor the state of the electronic device 101. While the wireless charging-sharing function is being performed, the processor 120 may periodically or selectively monitor the state of the electronic device 101 via a sensor module (e.g., the sensor module 176 in FIG. 1). For example, the processor 120 may monitor the state of the electronic device 101 while the power stored in a battery (e.g., the battery 189 in FIG. 1) is being transmitted to a second electronic device (e.g., the second electronic device 102 in FIG. 1). The second electronic device 102 may be in contact with the electronic device 101 or located at a short distance from the electronic device 101 so as to receive power from the electronic device 101. The state of the electronic device 101 may include at least one of a temperature (or a battery temperature), overcurrent detection, or a wireless charging error of the electronic device 101.

In operation 2403, the processor 120 may identify (or determine) whether an abnormality is detected in the electronic device 101, based on the state of the electronic device 101. For example, the processor 120 may determine whether the temperature of the electronic device 101 exceeds a reference temperature, whether the electronic device 101 is using overcurrent, or whether an error occurs in the wireless charging-sharing of the electronic device 101 with an error. When an abnormality is detected in the electronic device 101 (operation 2403—"YES"), the processor 120 may perform operation 2421, and when no error is detected in the electronic device 101 (operation 2403—"NO"), the processor 120 may perform operation 2405. In at least one of a case in which the temperature of the electronic device 101 is higher than the reference temperature, a case in which the electronic device 101 uses overcurrent, or a case in which an error occurs in the wireless charging-sharing of the electronic device 101 (operation 2403—"YES"), the processor 120 may perform operation 2421. When the temperature of the electronic device 101 is equal to or lower than the reference temperature, the electronic device 101 does not use overcurrent, and no error occurs in the wireless charging-sharing of the electronic device 101 (operation 2403—"NO"), the processor 120 may perform operation 2405.

When no abnormality is detected in the electronic device 101, in operation 2405, the processor 120 may detect (or recognize) a device. The device may be a wired charger that supplies power to the electronic device 101 or an external device that receives power from the electronic device 101 (e.g., an OTG device). When the interface of the device (e.g., the first external device 502 in FIG. 5) is inserted into a connection terminal (e.g., the connection terminal 178) of the electronic device 101, the processor 120 may recognize the device.

In operation 2407, the processor 120 may determine whether the detected device is a charger (e.g., a wired charger). When the detected device is a charger (operation 2407—"YES"), the processor 120 may perform operation 2409, and when the detected device is not a charger (operation 2407—"NO"), the processor 120 may perform operation 2423.

When the detected device is a charger (operation 2407—"YES"), in operation 2409, the processor 120 may provide a user notification. The user notification may be one for informing that the charger is connected during the wireless charging-sharing. The user notification may include buttons for selecting whether to maintain the wireless charging-sharing or whether to stop the wireless charging-sharing.

In operation 2411, the processor 120 may provide a user input in response to the user notification. The user input may be one for selecting one of a button for maintaining wireless charging-sharing and a button for stopping wireless charging-sharing included in the user notification.

In operation 2413, the processor 120 may identify (or determine) whether to maintain the wireless charging-sharing or whether to stop wireless charging-sharing, based on the user input. When the user input of selecting the button for maintaining the wireless charging-sharing is detected (2413—"YES"), the processor 120 may perform operation 2415, and when the user input of selecting the button for stopping the wireless charging-sharing (operation 2413—"NO"), the processor 120 may perform operation 2421.

When the wireless charging-sharing is maintained (operation 2413—"YES"), in operation 2415, the processor 120 may perform charging using the wired charger. The processor 120 may perform charging using the wired charger while maintaining the wireless charging-sharing. When the wireless charging-sharing and the charging through the wired charger are simultaneously performed, the processor 120 may simultaneously perform the charging of the battery 189 and power supply according to a wired/wireless charging rule. For example, the processor 120 may charge the battery 189 with a part of the power supplied from the wired charger and may transmit a remaining part of the supplied power to the second electronic device 102. The processor 120 may perform the operations included in FIG. 25 after performing operation 2415. For example, the processor 120 may periodically or selectively perform the operations included in FIG. 24 and the operations included in FIG. 25 so as to control the wireless charging-sharing function depending on the state of the electronic device 101.

When stopping the wireless charging-sharing (operation 2413—"NO"), in operation 2421, the processor 120 may turn off the wireless charging-sharing function. The processor 120 may switch the wireless charging-sharing function from ON to OFF. When the wireless charging-sharing function is switched to OFF, the wireless charging-sharing function may be stopped. The processor 120 may provide the user notification concerning the sharing stop through a display (e.g., the display device 160 in FIG. 1) or a speaker (e.g., the sound output device 155 in FIG. 1). The processor 120 may perform operation 2429 after performing operation 2421.

When the detected device is not a charger (operation 2407—"NO"), in operation 2423, the processor 120 may turn off the wireless charging-sharing function. The processor 120 may stop the wireless charging-sharing by turning off the wireless charging-sharing function (e.g., switching from ON to OFF), and may provide the user notification concerning the sharing stop and the external device detection through a display (e.g., the display device 160 in FIG. 1) or a speaker (e.g., the sound output device 155 in FIG. 1). Since operation 2423 is the same as or similar to operation 2421, a detailed description thereof may be omitted.

In operation 2425, the processor 120 may connect the electronic device with an external device. The processor 120 may output power stored in the battery 189 to the external device detected in operation 2405 so as to connect the electronic device with the external device. Since operation 2425 is the same as or similar to operation 1711 of FIG. 17, a detailed description thereof will be omitted.

In operation 2427, the processor 120 may identify (or determine) whether the connection with the electronic device is released. The processor 120 may perform an operation 2429 when the connection with the external device is released (operation 2427—"YES"). When the connection with the external device is not released (operation 2427—"NO"), the processor 120 may return to operation 2427 and may periodically monitor whether the connection with the external device is released.

In operation 2429, the processor 120 may identify (or determine) whether the wireless charging-sharing is requested. When the wireless charging-sharing function is switched from "OFF" to "ON" according to the user input, the processor 120 may determine that the wireless charging-sharing is requested. The processor 120 may perform operation 2431 when the wireless charging-sharing is requested (operation 2429—"YES").

When the wireless charging-sharing is requested (operation 2429—"YES"), in operation 2431, the processor 120 may perform the wireless charging-sharing function. The processor 120 may perform the wireless charging-sharing function by transmitting the power stored in the battery 189 to the second electronic device 102. When the wireless charging-sharing is not requested (operation 2429—"NO"), the processor 120 may return to operation 2429 and may periodically monitor whether the wireless charging-sharing is requested. The processor 120 may return operation 2401 after performing operation 2431.

Figure 25:
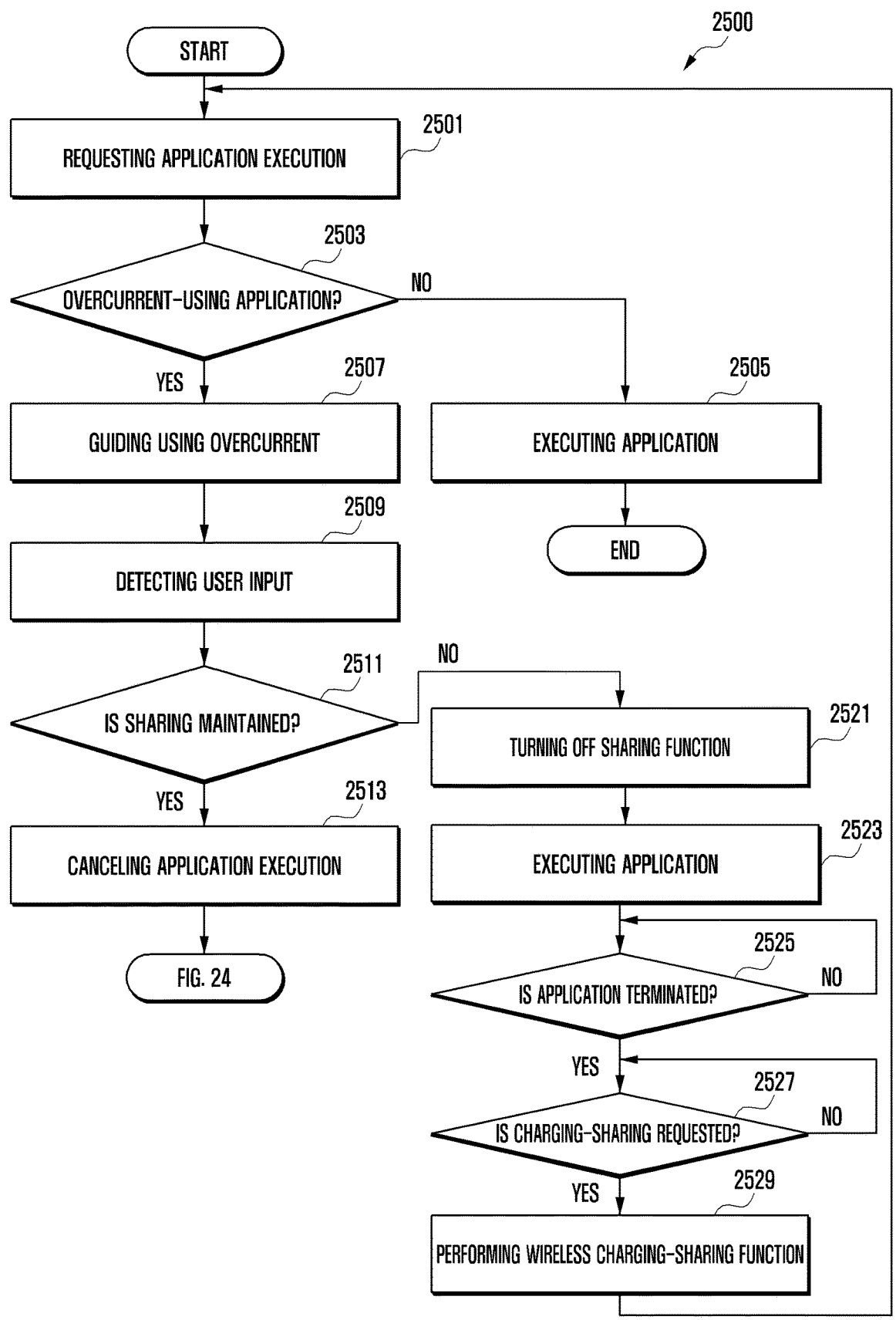
FIG. 25 is a flowchart 2500 illustrating an operation method according to execution of an application in an electronic device according to certain embodiments.

FIG. 25 is a flowchart 2500 illustrating an operation method according to execution of an application in an electronic device according to certain embodiments. The operation of FIG. 24 may an operation that is performed when the electronic device (e.g., the electronic device 101 in FIG. 1) according to certain embodiments operates in the wireless power Tx mode.

Referring to FIG. 25, in operation 2501, a processor (e.g., the processor 120 in FIG. 1) of the electronic device 101 may receive an application execution request. The processor 120 may receive the application execution request from the user through an input device (e.g., the input device 150 in FIG. 1).

In operation 2503, the processor 120 may identify (or determine) whether or not the application requested to be executed is an overcurrent-using application. The overcurrent-using application may mean an application that may cause the use of overcurrent in the electronic device 101. For example, some game applications may cause the use of overcurrent in the electronic device 101. When the application requested to be executed in operation 2501 is an overcurrent-using application (operation 2503—"YES"), the processor 120 may perform operation 2507, and when the application requested to be executed is not an overcurrent-using application (operation 2503—"NO"), the processor 120 may perform operation 2505.

When the application requested to be executed is not an overcurrent-using application (operation 2503—"NO"), in operation 2505, the processor 120 may execute the application. The application may be one requested to be executed in operation 2501. The processor 120 may provide a screen associated with the executed application through a display (e.g., the display device 160 in FIG. 1).

When the application requested to be executed is an overcurrent-using application (operation 2503—"YES"), in operation 2507, the processor 120 may guide the use of overcurrent. The processor 120 may inform the user of the fact that the execution of the overcurrent-using application is requested during the wireless charging-sharing. The processor 120 may include buttons for selecting whether to maintain the wireless charging-sharing or whether to stop the wireless charging-sharing when guiding the use of overcurrent.

In operation 2509, the processor 120 may detect a user input. The user input may be one for selecting one of the button for maintaining wireless charging-sharing and the button for stopping wireless charging-sharing included in the overcurrent use guidance.

In operation 2511, the processor 120 may identify (or determine) whether to maintain the wireless charging-sharing or whether to stop wireless charging-sharing, based on the user input. When the user input of selecting the button for maintaining the wireless charging-sharing is detected (2511—"YES"), the processor 120 may perform operation 2513, and when the user input of selecting the button for stopping the wireless charging-sharing (operation 2511—"NO"), the processor 120 may perform operation 2521.

When the wireless charging-sharing is maintained (operation 2511—"YES"), in operation 2513, the processor 120 may cancel the execution of the application. The processor 120 may not execute the application requested to be executed in operation 2501 when the wireless charging-sharing is maintained. For example, the processor 120 may cancel the execution of an application that interferes with the wireless charging-sharing. The processor 120 may inform the user of the fact that the execution of the application is canceled. The processor 120 may inform the user of the cancellation of execution of the application through a display (e.g., the display device 160 in FIG. 1). According to certain embodiments, the processor 120 may maintain the wireless charging-sharing as no overcurrent-using application is executed. The processor 120 may inform the user that the wireless charging-sharing is maintained through a display (e.g., the display device 160 in FIG. 1). The processor 120 may perform the operations of FIG. 24 after performing operation 2515. For example, the processor 120 may periodically or selectively perform the operations included in FIG. 24 and the operations included in FIG. 25 so as to control the wireless charging-sharing function depending on the state of the electronic device 101.

When stopping the wireless charging-sharing (operation 2511—"NO"), in operation 2521, the processor 120 may turn off the wireless charging-sharing function. The processor 120 may switch the wireless charging-sharing function from ON to OFF. When the wireless charging-sharing function is switched to OFF, the wireless charging-sharing function may be stopped. The processor 120 may provide a user notification indicating that the wireless charging-sharing is stopped in order to execute the overcurrent-using application through a display (e.g., the display device 160 in FIG. 1) or a speaker (e.g., the sound output device 155 in FIG. 1).

In operation 2523, the processor 120 may execute the application requested to be executed in operation 2501. The processor 120 may execute the application requested to be executed in operation 2501 by stopping the wireless charging-sharing that interferes with the use of overcurrent.

In operation 2525, the processor 120 may identify (or determine) whether or not the executed application is terminated. When the executed application is terminated (operation 2525—"YES"), the processor 120 may perform operation 2527. When the executed application is not terminated (operation 2525—"NO"), the processor 120 may return to operation 2525 and may periodically or selectively monitor whether or not the executed application is terminated.

In operation 2527, the processor 120 may identify (or determine) whether the wireless charging-sharing is requested. When the wireless charging-sharing function is switched from "OFF" to "ON" according to the user input, the processor 120 may determine that the wireless charging-sharing is requested. The processor 120 may perform operation 2529 when the wireless charging-sharing is requested.

When the wireless charging-sharing is requested (operation 2527—"YES"), in operation 2529, the processor 120 may perform the wireless charging-sharing function. The processor 120 may perform the wireless charging-sharing function by transmitting the power stored in the battery 189 to the second electronic device 102. The processor 120 may return to operation 2501 after performing operation 2529. When the wireless charging-sharing is not requested (operation 2527—"NO"), the processor 120 may return to operation 2529 and may periodically monitor whether or not the wireless charging-sharing is requested.

A method of operating an electronic device (e.g., the electronic device 101 in FIG. 1) according to certain embodiments may include: an operation of detecting an event while the electronic device shares wireless charging-sharing with another electronic device (e.g., the second electronic device 102 in FIG. 1); an operation of turning off a wireless charging-sharing function when the event corresponds to a predetermined condition; an operation of providing a user notification about the turning-off of the wireless charging-sharing; and an operation of turning on the wireless charging-sharing function when a state of the electronic device corresponds to a wireless charging-sharing condition.

The predetermined condition may include at least one of heat generation, wired charger connection, external device connection, overcurrent detection, or wireless charging error of the electronic device.

According to certain embodiments, it is possible to enhance the usability of the electronic device by controlling the electronic device to use the wireless charging-sharing function.

According to certain embodiments, it is possible to improve the user's convenience by enabling the electronic device to share power with another electronic device without carrying a wired/wireless charging device.

According to certain embodiments, it is possible to enhance the user's safety by continuously monitoring the state of the electronic device while the wireless charging-sharing function is being performed and interrupting the wireless charging-sharing function when an error occurs in the electronic device.

The embodiments of the disclosure disclosed herein and shown in the drawings are merely specific examples presented in order to easily describe technical details of the disclosure and to help the understanding of the disclosure, and are not intended to limit the disclosure. Therefore, it should be construed that, in addition to the embodiments disclosed herein, all modifications and changes or modified and changed forms derived from the technical idea of the disclosure fall within the disclosure.

What is claimed is:

1. An electronic device comprising:
a battery;
a communication module including a wireless interface operatively or electrically connected with the battery;
a display;
a memory; and
a processor, wherein the processor is configured to:
detect an event while the electronic device is in contact with or is connected to another electronic device via the wireless interface and wirelessly charging-shares power of the battery with the another electronic device via the wireless interface;
turn off a wireless charging-sharing function when the event corresponds to a predetermined condition;
provide a user notification about the turning-off of the wireless charging-sharing function via the display;
monitor whether a state of the electronic device corresponds to a wireless charging-sharing condition; and
resume the wireless charging-sharing function when the state of the electronic device corresponds to the wireless charging-sharing condition, wherein turning on the wireless charging-sharing comprises wirelessly charging shares power of the battery with the another electronic device.

2. The electronic device of claim 1, wherein the predetermined condition is set to include at least one of heat generation, wired charger connection, external device connection, overcurrent detection, or wireless charging error of the electronic device.

3. The electronic device of claim 1, further comprising:
a sensor module,
wherein the processor is configured to:
measure a battery temperature of the electronic device using the sensor module; and
turn off the wireless charging-sharing function and provide the user notification when the measured battery temperature is higher than a reference temperature.

4. The electronic device of claim 1, wherein the processor is configured to:
turn off the wireless charging-sharing function and provide the user notification when wired charging information is received from the another electronic device.

5. The electronic device of claim 1, wherein the processor is configured to:
provide the user notification when a wired charger is recognized; and
control the wireless charging-sharing function, based on a user input in response to the user notification.

6. The electronic device of claim 5, wherein the processor is configured to:
maintain the wireless charging-sharing function according to the user input; and
perform charging through the wired charger.

7. The electronic device of claim 5, wherein the processor is configured to:
turn off the wireless charging-sharing function according to the user input; and
perform charging through the wired charger.

8. The electronic device of claim 1, wherein the processor is configured to:
provide a user notification when a wired charger is recognized;
transmit wired charging information to the another electronic device; and
perform charging through the wired charger.

9. The electronic device of claim 1, wherein the processor is configured to:
inform the user of detection of an external device when the external device is detected;
turn off the wireless charging-sharing function; and
output the power of the battery to the external device.

10. The electronic device of claim 1, further comprising:
a power management module,
wherein the processor is configured to:
detect use of overcurrent of the electronic device using the power management module; and
turn off the wireless charging-sharing function and provide the user notification when the use of the overcurrent is detected.

11. The electronic device of claim 1, wherein the processor is configured to:
receive charging status information from the another electronic device;
analyze the wireless charging state, based on the charging state information;
identify whether the wireless charging-sharing is error, based on a result of the analyzing;
count a number of errors when an error of the wireless charging-sharing occurs;
determine whether the number of errors exceeds a set number; and
control the wireless charging-sharing function, based on whether the number of errors exceeds the set number.

12. The electronic device of claim 11, wherein the processor is configured to: turn off the wireless charging-sharing function when the number of errors does not exceed the set number; and
switch the wireless charging-sharing function from OFF to ON so as to perform the wireless charging-sharing function.

13. The electronic device of claim 11, wherein the processor is configured to:
turn off the wireless charging-sharing function so as to stop wireless charging-sharing when the number of errors exceeds the set number;
provide a user notification about the stopping of the wireless charging-sharing; and
inform the another electronic device of the stopping of wireless charging-sharing.

14. The electronic device of claim 1, wherein the processor is configured to:
receive application execution request;
identify whether the requested application is an overcurrent-using application;
provide a user notification when the requested application is the overcurrent-using application; and
control the wireless charging-sharing function, based on a user input in response to the user notification.

15. The electronic device of claim 14, wherein the processor is configured to:
cancel execution of the requested application according to the user input; and maintain the wireless charging-sharing function.

16. The electronic device of claim 14, wherein the processor is configured to:
turn off the wireless charging-sharing function according to the user input; and
execute the requested application.

17. The electronic device of claim 1, wherein the processor is configured to:
monitor the state of the electronic device while performing the wireless charging-sharing function;
detect abnormality of the electronic device, based on the state of the electronic device;
turn off the wireless charging-sharing function so as to stop wireless charging-sharing with the another electronic device when the abnormality of the electronic device is detected; and
turn on the wireless charging-sharing function, based on the a wireless charging-sharing request of the user.

18. The electronic device of claim 17, wherein the processor is configured to:
determine that there is abnormality in the electronic device when the state of the electronic device corresponds to at least one of states in which a temperature of the electronic device is higher than a reference temperature, in which an overcurrent is used in the electronic device, and in which an error occurs in the wireless charging-sharing.

19. A method of operating an electronic device, the method comprising:
detecting an event while the electronic device shares wireless charging-sharing with another electronic device;
turning off a wireless charging-sharing function when the event corresponds to a predetermined condition;
providing a user notification about the turning-off of the wireless charging-sharing;
monitor whether a state of the electronic device corresponds to a wireless charging-sharing condition; and
resuming the wireless charging-sharing function when the state of the electronic device corresponds to the wireless charging-sharing condition, wherein turning on the wireless charging-sharing comprises wirelessly charging shares power of a battery with the another electronic device.

20. The method of claim 19, wherein the predetermined condition includes at least one of heat generation, wired charger connection, external device connection, overcurrent detection, or wireless charging error of the electronic device.

* * * * *